US012333801B2

(12) United States Patent
Rajora et al.

(10) Patent No.: US 12,333,801 B2
(45) Date of Patent: Jun. 17, 2025

(54) SYSTEMS AND METHODS FOR IDENTIFYING TREES AND ESTIMATING TREE HEIGHTS AND OTHER TREE PARAMETERS

(71) Applicant: AIDash Inc., San Jose, CA (US)

(72) Inventors: Shantanu Rajora, Fremont, CA (US); Nitin Das, Haryana (IN)

(73) Assignee: AIDash Inc., San Jose, CA (US)

( * ) Notice: Subject to any disclaimer, the term of this patent is extended or adjusted under 35 U.S.C. 154(b) by 119 days.

(21) Appl. No.: 18/167,830

(22) Filed: Feb. 10, 2023

(65) Prior Publication Data

US 2024/0071073 A1 Feb. 29, 2024

Related U.S. Application Data

(60) Provisional application No. 63/478,111, filed on Dec. 30, 2022, provisional application No. 63/402,845, filed on Aug. 31, 2022.

(51) Int. Cl.
*G06T 7/62* (2017.01)
*G06T 7/00* (2017.01)
(Continued)

(52) U.S. Cl.
CPC .......... *G06V 20/188* (2022.01); *G06T 7/0002* (2013.01); *G06T 7/62* (2017.01);
(Continued)

(58) Field of Classification Search
CPC .... G06V 20/188; G06V 10/82; G06V 20/176; G06V 10/26; G06V 10/764; G06V 20/13;
(Continued)

(56) References Cited

U.S. PATENT DOCUMENTS

| | | | |
|---|---|---|---|
| 8,352,410 B2 * | 1/2013 | Rousselle | G06V 20/188 706/52 |
| 10,460,169 B1 | 10/2019 | Adler | |

(Continued)

OTHER PUBLICATIONS

International Application No. PCT/US2023/031302, International Search Report and the Written Opinion, dated Nov. 30, 2023, 13 pages.

(Continued)

*Primary Examiner* — Yu Chen
(74) *Attorney, Agent, or Firm* — Ahmann Kloke LLP

(57) ABSTRACT

An example method includes receiving georeferenced satellite images of a geographic region that includes electrical assets. Segmentation maps are generated by providing the georeferenced satellite images to fully convolutional networks to classify pixels of the georeferenced satellite images as either trees or non-trees. Rasters of the geographic region are generated based on the segmentation maps and vectors are generated based on the rasters. A vector includes one or more polygons, a polygon representing a tree and having a set of coordinates defining the polygon. Canopy height models are generated based on received digital surface models. The canopy height models include heights of trees in the geographic region. Heights of trees are associated with polygons. A height of a polygon is compared to a distance between the polygon and an electrical asset to identify a tree as a potential hazard. Notifications thereof are provided.

20 Claims, 24 Drawing Sheets

(51) Int. Cl.
*G06T 17/05* (2011.01)
*G06V 10/26* (2022.01)
*G06V 10/764* (2022.01)
*G06V 10/82* (2022.01)
*G06V 20/10* (2022.01)
*G06V 20/13* (2022.01)

(52) U.S. Cl.
CPC .............. *G06T 17/05* (2013.01); *G06V 10/26* (2022.01); *G06V 10/764* (2022.01); *G06V 10/82* (2022.01); *G06V 20/13* (2022.01); *G06V 20/176* (2022.01); *G06T 2207/10032* (2013.01); *G06T 2207/20081* (2013.01); *G06T 2207/20084* (2013.01); *G06T 2207/30184* (2013.01); *G06T 2207/30188* (2013.01)

(58) Field of Classification Search
CPC ......... G06T 7/62; G06T 7/0002; G06T 17/05; G06T 2207/10032; G06T 2207/20081; G06T 2207/20084; G06T 2207/30184; G06T 2207/30188
See application file for complete search history.

(56) References Cited

U.S. PATENT DOCUMENTS

| | | |
|---|---|---|
| 11,144,758 B2 | 10/2021 | Lavi |
| 11,308,714 B1 | 4/2022 | Christoudias et al. |
| 11,842,538 B2 | 12/2023 | Saxena et al. |
| 2008/0105045 A1* | 5/2008 | Woro ................ G01W 1/12 73/170.27 |
| 2009/0304236 A1 | 12/2009 | Francini et al. |
| 2018/0218214 A1* | 8/2018 | Pestun ................ G06V 20/176 |
| 2018/0260626 A1 | 9/2018 | Pestun et al. |
| 2018/0336460 A1 | 11/2018 | Tschemezki et al. |
| 2019/0098687 A1 | 3/2019 | Backholm et al. |
| 2019/0129039 A1* | 5/2019 | Schubert .............. G08G 5/0021 |
| 2019/0155973 A1 | 5/2019 | Morczinek et al. |
| 2019/0197134 A1 | 6/2019 | Reyes Martinez et al. |
| 2020/0075168 A1 | 3/2020 | Frank et al. |
| 2020/0250424 A1* | 8/2020 | Klein ..................... G06T 7/13 |
| 2021/0073692 A1* | 3/2021 | Saha ..................... G08B 21/16 |
| 2021/0097850 A1 | 4/2021 | Ton-That et al. |
| 2021/0118117 A1* | 4/2021 | Albrecht ............... G06F 18/214 |
| 2021/0142559 A1* | 5/2021 | Yousefhussien ............................ G06Q 10/06315 |
| 2021/0232818 A1* | 7/2021 | Saxena ................... G06N 3/04 |
| 2022/0414362 A1 | 12/2022 | Lautala et al. |
| 2023/0386199 A1* | 11/2023 | Klein ..................... G06Q 10/04 |
| 2024/0071073 A1 | 2/2024 | Rajora et al. |
| 2024/0330027 A1 | 10/2024 | Zeng et al. |

OTHER PUBLICATIONS

UP42, "Stereo imagery, DSM, and machine learning for vegetation management," [retrieved online from https://up42.com/blog/tech/stereo-imagery-dsm-and-machine-learning-for-vegetation-management on Jan. 19, 2023].

Canadian Patent Application No. 3168831, Examination Report dated Aug. 28, 2023, 3 pages.

European Patent Application No. 21747885.8, Extended European Search Report dated Dec. 12, 2023, 9 pages.

Zhentian, Jiao, et al., "A Deep Learning Based Forest Fire Detection Approach Using UAV and YOLOv3", 2019 1st International Conference on Industrial Artificial Intelligence (IAI) IEEE, Jul. 23, 2019 (Jul. 23, 2019), pp. 1-5, XP033621505, DOI: 10.1109/ICIAI.2019.8850815.

* cited by examiner

| Model/Data Set | Previous Model | Data Set 1 Model | Data Set 2 Model | Data Set 3 Model | Data Set 4 Model | Data Set 5 Model | Ensemble Model |
|---|---|---|---|---|---|---|---|
| Data Set 1 | 0.14 | 0.56 | 0.46 | 0.44 | 0.38 | 0.17 | 0.586506276 |
| Data Set 2 | 0.2 | 0.54 | 0.71 | 0.64 | 0.44 | 0.24 | 0.75 |
| Data Set 3 | 0.36 | 0.46 | 0.59 | 0.69 | 0.43 | 0.46 | 0.69342 |
| Data Set 4 | 0.02 | 0.68 | 0.68 | 0.64 | 0.73 | 0.007 | 0.73 |
| Data Set 5 | 0.786345219 | 0.14 | 0.63 | 0.75 | 0.19 | 0.81 | 0.82 |

| Validation Data Set/Model | Previous Model | Ensemble Model |
|---|---|---|
| Data Set 1 | 0.14 | 0.586506276 |
| Data Set 2 | 0.2 | 0.75 |
| Data Set 3 | 0.36 | 0.69342 |
| Data Set 4 | 0.02 | 0.73 |
| Data Set 5 | 0.786345219 | 0.82 |
| Avg score across all data sets | 0.30 | 0.71 |

620 ⤵

| Client | Veg Vs No Veg Accuracy (Cat 1,2,3 vs Cat 4) |
|---|---|
| Client A | 85% |
| Client B | 91% |

630 ⤵

| Veg vs No Veg Accuracy | 86% | | | |
|---|---|---|---|---|
| Categories/Confidence | 1 | 2 | 3 | 4 |
| High | 69% | 71% | 85% | 77% |
| High+Medium | 61% | 70% | 88% | 88% |
| High+Medium+Low | 59% | 68% | 88% | 89% |

640 ⤵

| Veg vs No Veg Accuracy | 86% | | | |
|---|---|---|---|---|
| Categories/Confidence | 1 | 2 | 3 | 4 |
| High | 69% | 71% | 85% | 77% |
| High+Medium | 61% | 70% | 88% | 88% |
| High+Medium+Low | 59% | 68% | 88% | 89% |

FIG. 6B

SYSTEMS AND METHODS FOR IDENTIFYING TREES AND ESTIMATING TREE HEIGHTS AND OTHER TREE PARAMETERS

CROSS-REFERENCE TO RELATED APPLICATION

This application claims priority to U.S. Provisional Patent Application No. 63/402,845 filed on Aug. 31, 2022, and entitled "Digitizing Tree Profiles and Estimating Height using Satellite Imagery," and U.S. Provisional Patent Application No. 63/478,111 filed on Dec. 30, 2022, and entitled "Systems and Methods for Identifying Trees and Estimating Tree Heights and other Tree Parameters," which are incorporated in their entirety herein by reference.

FIELD OF THE INVENTION(S)

Embodiments of the present invention(s) are generally related to identifying trees and estimating their heights using images, such as satellite images, and in particular to identifying trees that may pose a risk to electrical network assets.

BACKGROUND

Vegetation management is generally a challenging task for utilities. Over the years, falling and/or encroaching vegetation has led to large-scale power outages, extreme weather events, wildfires, natural disasters, and other vegetation-related hazards. As a result, pressure has increased on utilities to improve vegetation management. Manual vegetation management, however, is expensive and may impact system reliability. Further, it is difficult to manually inspect vegetation around electrical assets within a system that extends hundreds to thousands of miles, particularly over inaccessible terrain.

Current methods of vegetation management include sending utility workers to survey the trees and other vegetation in one particular area within a large geographic area. Utility workers may manually inspect trees and take notes about physical attributes such as tree height, height profiles at sub-tree levels, and other details.

These solutions may be inefficient and time-consuming, particularly in view of the fact that power lines are geographically dispersed. In the U.S. alone, there are an estimated 5.5 million miles of local distribution lines, and 200,000 miles of high-voltage transmission lines.

Manual tree inspection is costly, takes time (particularly travel time), and exposes workers to risk. Manual inspections are clearly not scalable. Further, manual inspections may not result in information that can be used to assess the risks of trees on electrical assets of a utility electrical power distribution infrastructure. For example, utility workers may miss vegetation most likely to impact electrical assets or the utility workers may make inaccurate assessments of tree parameters such as tree height, tree crown area, and distance from the tree to an electrical asset. Further, growth rates and changes over time may be inaccurately estimated, thereby creating risk before vegetation can be trimmed or otherwise controlled.

SUMMARY

In some embodiments, a non-transitory computer-readable medium comprises executable instructions. The executable instructions may be executable by one or more processors to perform a method. The method may comprise: receiving a set of georeferenced satellite images of a geographic region, the geographic region including multiple geographic areas, the multiple geographic areas including multiple electrical assets of one or more power distribution infrastructures, generating one or more segmentation maps by providing the set of georeferenced satellite images to one or more fully convolutional networks to classify pixels of the set of georeferenced satellite images as either trees or non-trees, generating one or more rasters of the geographic region based on the one or more segmentation maps and the set of georeferenced satellite images, generating one or more vectors based on the one or more rasters, a vector including one or more polygons, a polygon representing a tree and having a set of coordinates defining the polygon, receiving one or more digital surface models of the geographic region, generating one or more canopy height models of the geographic region based on the one or more digital surface models, the one or more canopy height models including heights of one or more trees in the geographic region, associating the heights of the one or more trees with the one or more polygons of the one or more vectors based on the one or more canopy height models, calculating a first distance between a first polygon having a first height and a first electrical asset of the one or more power distribution infrastructures, comparing the first distance and the first height, identifying a first tree represented by the first polygon as a potential hazard based on the comparing of the first distance and the first height, and providing a notification of the identification of the first tree as a potential hazard.

The method may further comprise calculating second distances between second polygons having second heights and second electrical assets of the one or more power distribution infrastructures, comparing the second distances and the second heights, identifying second trees represented by the second polygons as potential hazards based on the comparing of the second distances and the second heights, determining one or more facilities within each of the multiple geographic areas that are connected to second electrical assets of the one or more power distribution infrastructures, ranking the multiple geographic areas based on the second trees identified as potential hazards and the one or more facilities, and providing a notification of the ranking of the multiple geographic areas. The method may further comprise modifying at least one vegetation trim plan for the multiple geographic areas based upon the ranking of the multiple geographic areas. In some embodiments, modifying at least one vegetation trim plan for the multiple geographic areas includes modifying a frequency of occurrence of the at least one vegetation trim plan.

In some embodiments, the method further comprises receiving a set of georeferenced stereo satellite images of the geographic region and generating the one or more digital surface models of the geographic region based on the set of georeferenced stereo satellite images of the geographic region. Generating the one or more canopy height models of the geographic region may includes performing minimum pooling operations on the one or more digital surface models until a calculated peak signal to noise ratio of one or more initial digital terrain models to the one or more digital surface models does not exceed a first threshold, generating one or more initial canopy height models by subtracting the one or more initial digital terrain models from the one or more digital surface models, determining first pixels in the one or more initial canopy height models that have heights greater than a second threshold, determining second pixels in the one or more initial digital terrain models corresponding to the first pixels and replacing heights of the second pixels with null values, determining third pixels surrounding the second pixels in the one or more initial digital terrain models, generating one or more final digital terrain models by interpolating heights from the third pixels and replacing the heights of the second pixels with the interpolated heights, and generating the one or more canopy height models of the geographic region by subtracting the one or more final digital terrain models from the one or more digital surface models.

The method may further comprise determining a first triangle defined by the first height, a distance from a pixel of the first polygon corresponding to a center of mass of the polygon to the electrical asset, and a calculated hypotenuse and utilizing the first triangle in the identification of the first tree represented by the first polygon as a potential hazard.

The first polygon may have one or more heights, and the first height may be a maximum height of the one or more heights.

The method may further comprise calculating an area of the first polygon and calculating a volume of the first tree using the first height and the calculated area of the first polygon. Further, the method may further comprise identifying a species of the first tree and utilizing the species of the tree in calculating the volume of the first tree.

Generating the one or more segmentation maps may include providing the set of georeferenced satellite images to multiple fully convolutional networks to classify pixels of the set of georeferenced satellite images as either trees or non-trees to obtain multiple intermediate segmentation maps, wherein each of the multiple fully convolutional networks is trained on georeferenced satellite images from a particular satellite image third-party and providing the multiple intermediate segmentation maps to a fully convolutional network to combine the multiple intermediate segmentation maps to obtain the one or more segmentation maps.

An example system may comprise at least one processor and memory containing instructions. The instructions may be executable by the at least one processor to receive a set of georeferenced satellite images of a geographic region, the geographic region including multiple geographic areas, the multiple geographic areas including multiple electrical assets of one or more power distribution infrastructures, generate one or more segmentation maps by providing the set of georeferenced satellite images to one or more fully convolutional networks to classify pixels of the set of georeferenced satellite images as either trees or non-trees, generate one or more rasters of the geographic region based on the one or more segmentation maps and the set of georeferenced satellite images, generate one or more vectors based on the one or more rasters, a vector including one or more polygons, a polygon representing a tree and having a set of coordinates defining the polygon, receive one or more digital surface models of the geographic region, generate one or more canopy height models of the geographic region based on the one or more digital surface models, the one or more canopy height models including heights of one or more trees in the geographic region, associate the heights of the one or more trees with the one or more polygons of the one or more vectors based on the one or more canopy height models, calculate a first distance between a first polygon having a first height and a first electrical asset of the one or more power distribution infrastructures, compare the first distance and the first height, identify a first tree represented by the first polygon as a potential hazard based on the comparing of the first distance and the first height, and providing a notification of the identification of the first tree as a potential hazard.

An example method may comprise: receiving a set of georeferenced satellite images of a geographic region, the geographic region including multiple geographic areas, the multiple geographic areas including multiple electrical assets of one or more power distribution infrastructures, generating one or more segmentation maps by providing the set of georeferenced satellite images to one or more fully convolutional networks to classify pixels of the set of georeferenced satellite images as either trees or non-trees, generating one or more rasters of the geographic region based on the one or more segmentation maps and the set of georeferenced satellite images, generating one or more vectors based on the one or more rasters, a vector including one or more polygons, a polygon representing a tree and having a set of coordinates defining the polygon, receiving one or more digital surface models of the geographic region, generating one or more canopy height models of the geographic region based on the one or more digital surface models, the one or more canopy height models including heights of one or more trees in the geographic region, associating the heights of the one or more trees with the one or more polygons of the one or more vectors based on the one or more canopy height models, calculating a first distance between a first polygon having a first height and a first electrical asset of the one or more power distribution infrastructures, comparing the first distance and the first height, identifying a first tree represented by the first polygon as a potential hazard based on the comparing of the first distance and the first height, and providing a notification of the identification of the first tree as a potential hazard.

BRIEF DESCRIPTION OF THE DRAWINGS

FIG. 6A displays a table containing results of tree segmentation for different sets of georeferenced satellite images performed by different fully convolutional networks and an ensemble fully convolutional network in some embodiments.

FIG. 6B displays tables containing validation results of an ensemble fully convolutional network in some embodiments.

DETAILED DESCRIPTION

Figure 1:
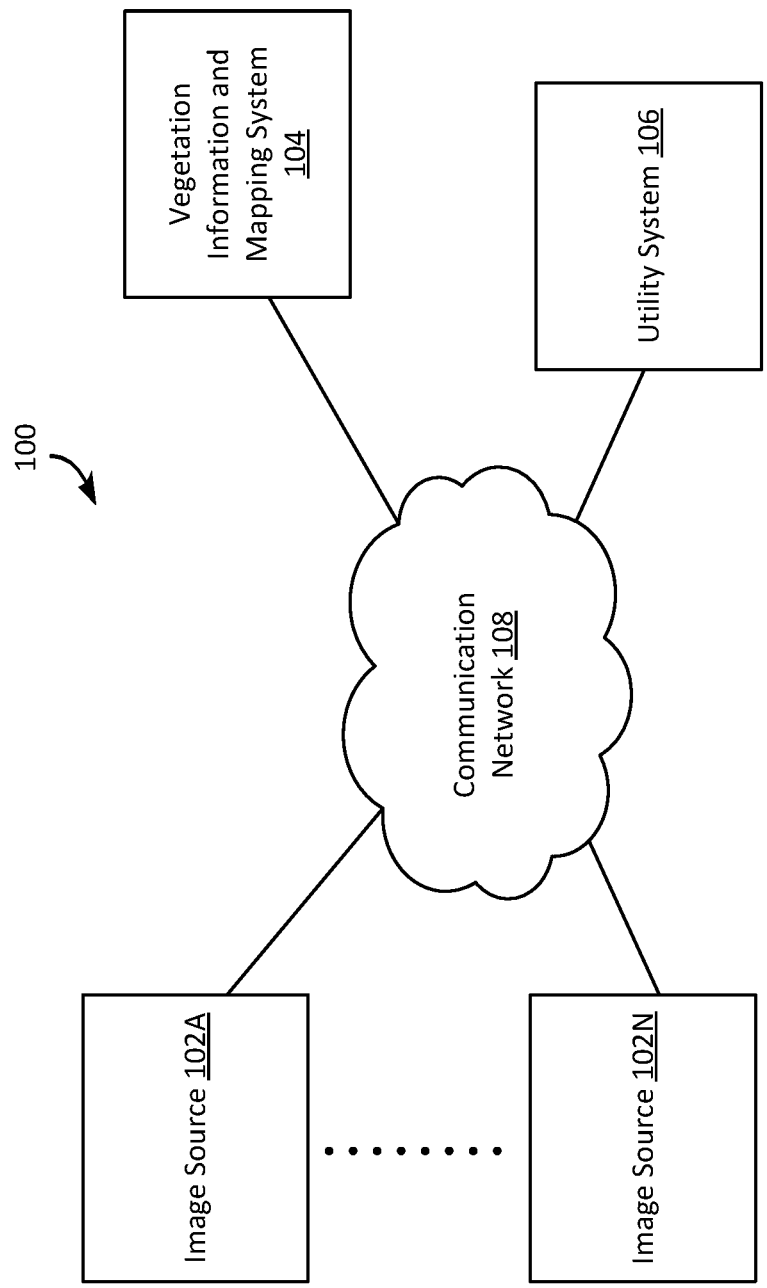
FIG. 1 depicts an example environment in which trees may be identified and tree parameters estimated in some embodiments.

As discussed herein, problems with manual inspection of electrical assets (e.g., transformers, poles, transmission lines, distribution lines, and/or the like) is the difficulty of utility personnel to inspect all vegetation that may impact functionality. Further, given the amount of territory that at utility inspects for vegetation management, utility personnel may be attempting to inspect utilities in poor conditions (e.g., cold, heat, rain, snow, or the like) and personnel may not be sufficiently trained. For this reason, manual inspection can be inaccurate, missing information, misleading, costly, and take considerable time. Inaccurate information, missing information, and delays can also create unanticipated risks of wildfires and service failure which can lead to widespread damage and loss of life.

Accordingly, it would be advantageous to have scalable systems and methods for identifying trees and estimating tree parameters so as to be able to identify trees that may pose risks to utility assets such as transmission lines and distribution lines.

some embodiments, a vegetation information and mapping system (VIMS) may identify vegetation (e.g., trees) and estimates parameters of vegetation based on aerial images (e.g., satellite, drone, or airplane images). The VIMS may use such vegetation parameters, such as vegetation heights, to determine whether vegetation may be potential hazards to electrical assets.

In some embodiments, the VIMS may generate segmentation maps by using convolutional neural networks to classify pixels of satellite images as either vegetation or non-vegetation. The VIMS may also generate rasters and vectors that include polygons that represent vegetation, such as trees. The VIMS may use digital surface models to generate canopy height models that include vegetation heights. The VIMS may then calculate or estimate distances between polygons and electrical assets, compare the distances to the vegetation heights, and use the comparison to determine whether vegetation may be potential hazards to electrical assets. The VIMS may provide notifications of the potentially hazardous vegetation to utilities.

A utility may have electrical power distribution infrastructures in multiple geographic areas, and different geographic areas may serve different types of utility customers. For example, one geographic area may be primarily residential. Another geographic area may be primarily commercial or industrial. Another geographic area may include government buildings such as schools or hospitals. In various embodiments, the VIMS may determine facilities within geographic areas that the utility serves. The VIMS may also identify vegetation such as trees as potential hazards that are within the geographic areas. The VIMS may rank the geographic areas in terms of priority based on the facilities within the geographic areas and the potential hazard trees. For example, the VIMS may rank a geographic area that has government buildings (e.g., police stations, fire houses, and/or the like) as a higher priority than a geographic area that serves primarily residential customers. The VIMS may then notify the utility of the ranked geographic areas. In some embodiments, the VIMS may automatically modify vegetation trim plans of the utility to ensure that higher ranked geographic areas are treated appropriately.

It will be appreciated that various embodiments for identifying vegetation and estimating vegetation parameters correct problems caused by current approaches or technologies. For example, current approaches or technologies may result in not identifying the trees that pose the greatest risks to utility assets. One or more embodiments of the VIMS described herein allow for utilities to identify vegetation (such as trees), identify which vegetation may pose potential hazards to utility assets, and thereby act to mitigate such risks by modifying their vegetation trim plans to deal with such vegetation.

FIG. 1 depicts an example environment 100 in which vegetation may be identified and vegetation parameters estimated in some embodiments. vegetation parameters may include but is not limited to vegetation heights, vegetation crown areas, vegetation volumes, and/or vegetation densities. For example, vegetation parameters may include but is not limited to tree heights, tree crown areas, tree volumes, and/or tree densities. The example environment 100 includes image sources 102A to 102N (individually, image source 102 collectively), a communication network 108, a vegetation information and mapping system 104 (VIMS 104), and a utility system 106. Each of the VIMS 104 and the utility system 106 may be or include any number of digital devices. A digital device is any device with a processor and memory. Digital devices are further discussed herein (for example, see FIG. 11).

Image sources 102A to 102N may each be a third-party system configured to provide images or access to images. Different third-parties may periodically capture images of geographic regions. For example, some third-parties at regular intervals or on-demand may obtain images of geographic regions from satellites, airplanes, helicopters, and/or drones for a variety of purposes. Different third-parties may obtain images from different sources (for example, different satellites, airplanes, helicopters, drones, or the like) for the same and/or different geographic regions. An example of a third-party that captures, collects, and/or provides images covering geographic regions includes Airbus Aerial. The third-parties may provide images and/or license access to the images to other businesses for a variety of purposes (e.g., via one or more image sources 102A-102N).

Figure 4B:
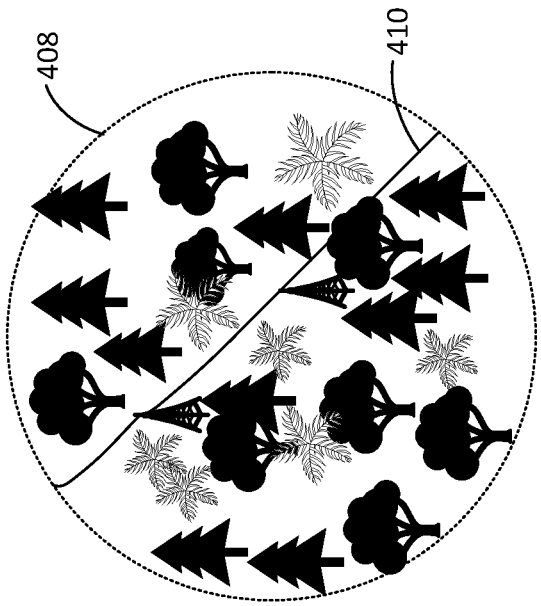
FIG. 4B depicts a zoomed-in portion of the geographic area of FIG. 4A.
Figure 4A:
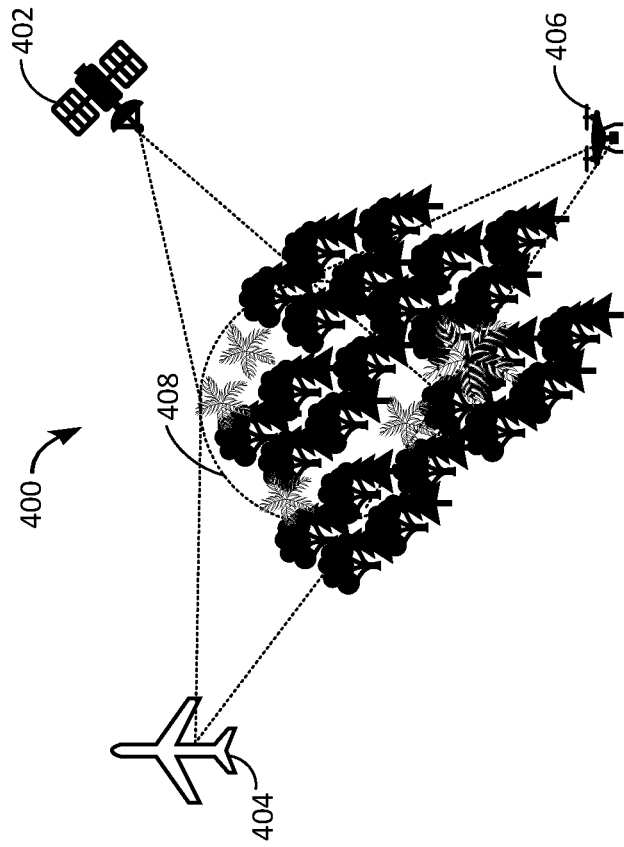
FIG. 4A depicts a geographic area where electrical assets may be located in some embodiments.

FIG. 4A depicts a geographic area 400 where electrical assets may be located in some embodiments. The electrical assets may not be visible from below given the terrain and vegetation. Images of the geographic area may be captured by, for example, a satellite 402, an aircraft 404, and/or a drone 406. Images and/or information (e.g., geographic coordinates and the like) may be stored and provided to others via one or more image sources 102A-102N.

Figure 3:
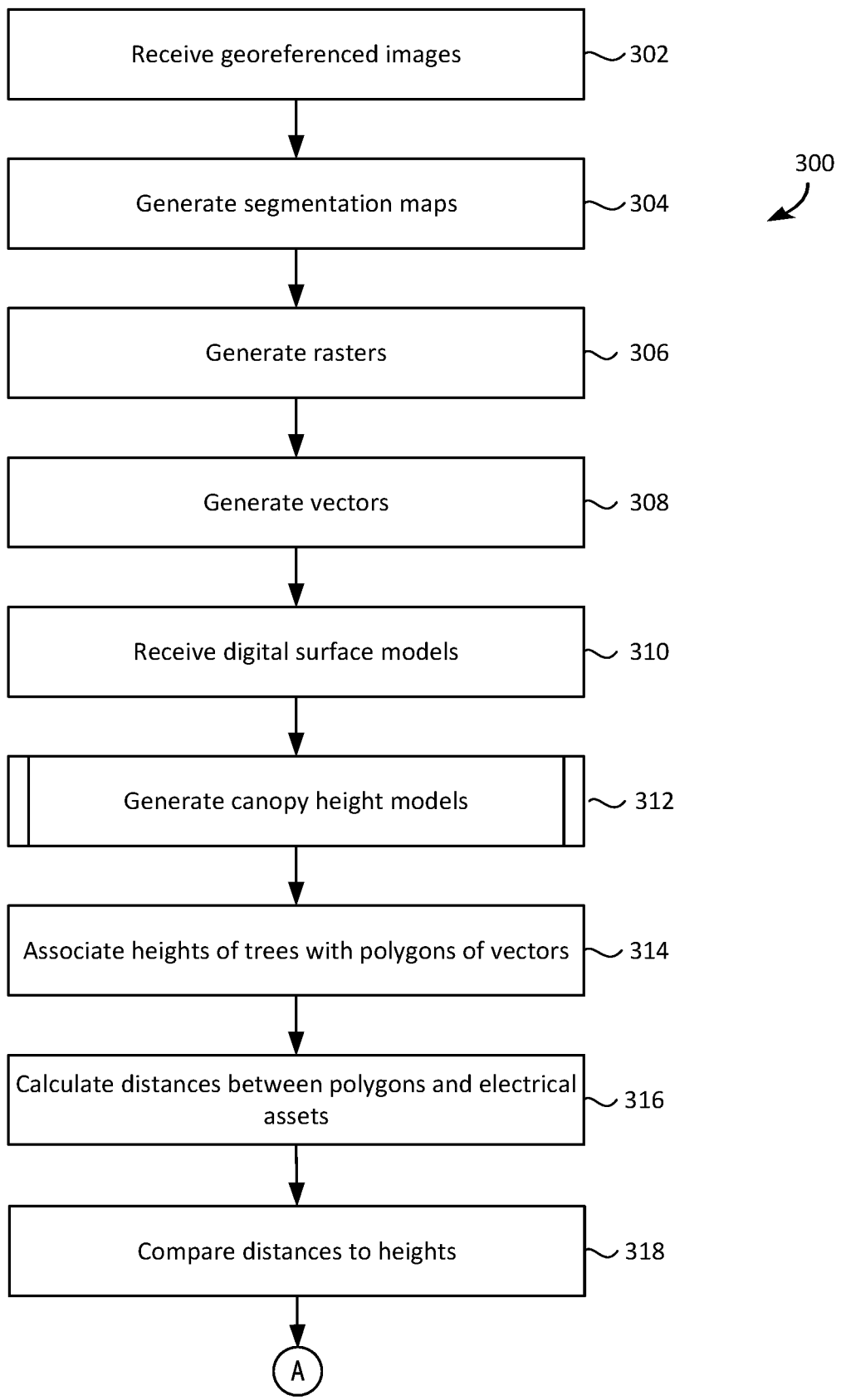
FIG. 3 is a flow chart showing a method for identifying trees as potential hazards and providing a notification in some embodiments.
Figure 3:
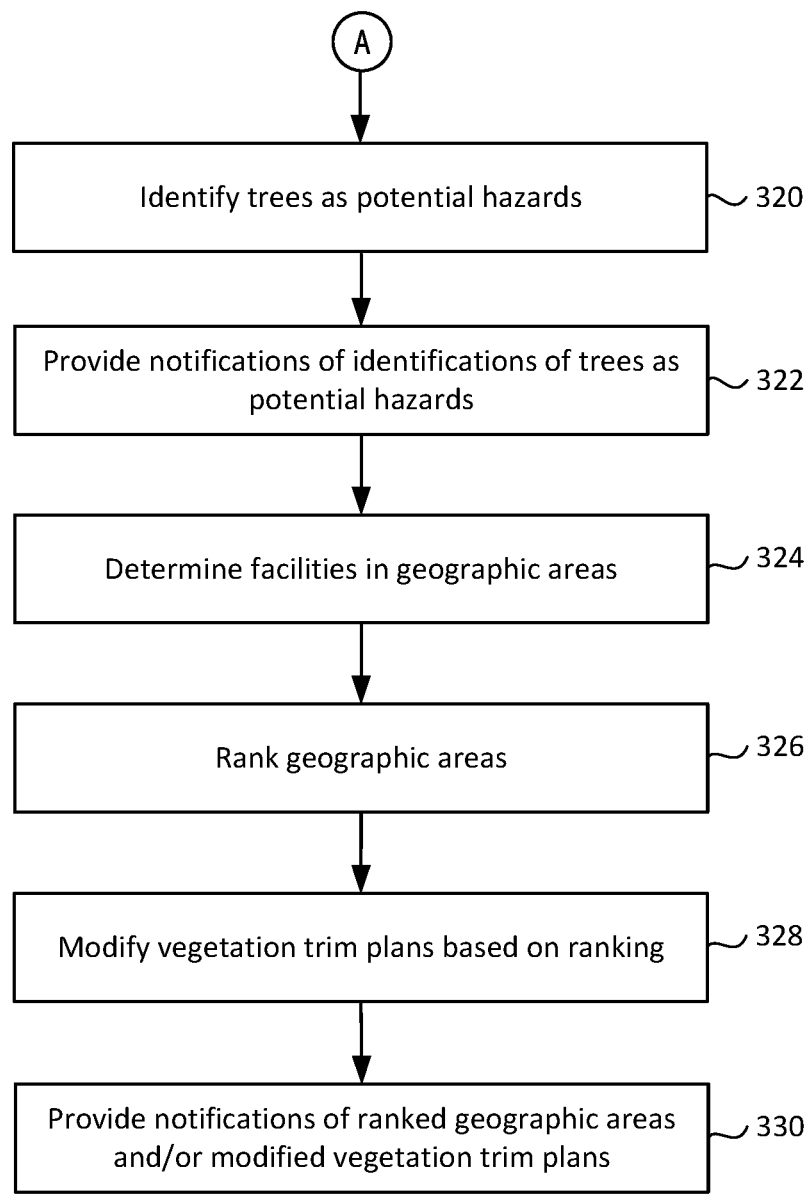

FIG. 4B depicts an example zoomed-in portion 408 of the geographic area 400 of FIG. 4A, containing an electrical asset 410, which is an electrical powerline, such as a transmission line or a distribution line. As discussed further herein with reference to, for example, FIG. 3, the tree information and mapping system 104 may calculate distances between electrical assets, such as the electrical asset 410 and vegetation proximate to electrical assets.

Returning to FIG. 1, in some embodiments, any number of the image sources 102A-N may obtain images of the same geographic area (e.g., from satellites, aircraft, and/or drones) and save them over time. As such, an image source 102A may obtain and store images of the same geographic site taken on different days, months, or years. For example, an image source 102A may provide images at a first duration of time (for example, taken at a particular time and date). The image source 102A may also provide images at a second duration of time of the same geographic areas (for example, taken at a different particular time or date such as one or more years before or after the first duration).

Any number of the image sources 102A-N may provide application programming interfaces (APIs) to enable another system (for example, the VIMS 104) to request images for a particular geographic area (for example, all or part of a geographic region). The request may be a request for current images and/or for images of the same geographic areas taken at different times. In various embodiments, the other business may request information on what geographic area images are available and at what time frames. A geographic area may be a subset of a geographic region. A geographic region is any portion on the surface of the earth. In various embodiments described herein, a geographic region includes assets (for example, electrical network assets).

The vegetation information and mapping system (VIMS) 104 may be configured to receive images of any number of geographic areas. The VIMS 104 may utilize the images to identify vegetation and/or other obstacles that may interfere with the safety and operation of assets of a local distribution network and/or a high-voltage distribution network (which alone or together may be referred to herein as an electrical network). An asset of an electrical network may include, for example, one or more transmission lines, distribution stations, feeder lines, circuit spans, segments, poles, transformers, substations, towers, switches, relays, and/or the like (referred to herein as electrical assets).

In various embodiments, the VIMS 104 may enhance, orient, and analyze (for example, using artificial intelligence (AI)/machine learning (ML) systems) geographic images to identify trees and/or vegetation in the images. The VIMS 104 may estimate the heights of trees, their crown areas, their volumes, and/or their densities. In some embodiments, the VIMS 104 may plot the vegetation (such as trees) as vectors on maps.

In various embodiments, the VIMS 104 may request current satellite images from third-parties such as Airbus Aerial and utilize the images to identify overgrown trees that require trimming. The VIMS 104 may request other satellite, airplane, helicopter, and/or drone images for the same geographic areas from the same and/or different image sources (e.g., image sources 102A-102N), combine the images from different image sources for the same geographic areas and then analyze the information to identify potential threats to electrical assets and/or other information.

Utilizing satellite, airplane, helicopter, and/or drone images provides a significant advantage over manual viewing from the ground. Satellite images are images of Earth collected by imaging satellites operated by governments and businesses. In addition to ease in obtaining the images, it will be appreciated that satellite images may have sufficient spatial resolution (e.g., 30-centimeter (cm)×30 cm) for evaluating vegetation. The spatial resolution refers to the size of a geographic area on the Earth represented by one pixel of the satellite image. For example, a 30 cm×30 cm spatial resolution means each pixel of the satellite image represents a 900 square centimeter area. Different aerial or satellite images may have different spatial resolutions. In one example, a set of satellite images have a spatial resolution of 50 m×50 m. In some embodiments, satellite images have spatial resolutions other than 30 cm×30 cm and 50 m×50 m. Due to cost constraints and/or image availability, the VIMS 104 may receive images of the same area with different spatial resolutions.

In some embodiments, the VIMS 104 may utilize AI, such as a trained convolutional neural network (CNN), to improve the quality of captured images using histogram modification, contrast enhancement, and/or bilinear interpolation to generate high-resolution images from low-resolution images. U.S. patent application Ser. No. 17/160,231 filed on Jan. 27, 2021, and entitled "SYSTEM AND METHOD OF INTELLIGENT VEGETATION MANAGEMENT," describes such utilization of AI, and is incorporated in its entirety herein by reference.

Satellite images may be captured using both a red-green-blue (RGB) band as well as an infrared (I.R.) band. By capturing satellite image using the RGB band and I.R. band, the VIMS 104 may generate a three-dimensional (3D) model of an area of the Earth and output the 3D model onto a user interface.

The cost of satellite imagery may be high, such as an average of $1 per square kilometer with a spatial resolution of 30 cm×30 cm. Accordingly, images captured using other image capture forms may be considered. In some terrains, such as residential areas with a lot of mature trees obscuring transmission lines, a spatial resolution higher than 30 cm×30 cm may be insufficient. The cost of satellite imagery may make this imagery solution too expensive and prohibitive. To obtain images of terrains with a spatial resolution of less than 30 cm×30 cm may require other forms of image capture, such as drones. Drones have a limited flight time, and therefore, the area of the physical environment captured by drones may be less than that of a satellite.

Images may also be captured using an airplane, sometimes referred to as aviation photography, or by a helicopter, a drone, or other airborne vehicle. Similar to satellite images, images captured using airplanes, helicopters, drones and the like (generally referred to as aerial images) may be licensed or captured on-demand by private companies. Aerial images may have a higher spatial resolution than satellite images and may provide another source of digital images for VIMS 104.

To account for the differences in image capture angles which result from different forms of image capture, such as satellite, airplanes, helicopters, and drones, the VIMS 104 may receive images of the same area captured by different methods of image capture. In some embodiments, the VIMS 104 may utilize images from different methods of image capture to correct for different image capture angles, enhance the information contained within the images, and add information for more accurate analysis. The VIMS 104 may utilize machine learning (ML) algorithms or models to correct the image capture angles, which may distort objects captured in the images.

In various embodiments, due to environmental factors such as cloud coverage, smoke, or fog, a satellite may require more than one flyover to capture satellite images, or an airplane, helicopter and/or drone may require more than one pass to capture aerial images of a particular area. The VIMS 104 may utilize AI to recognize features on each of the multiple images of the particular area. Similarly, the VIMS 104 may utilize a CNN to improve the quality of captured images by using contrast enhancement. In some embodiments, the VIMS 104 may receive satellite imagery of the same area over several years and use that information to estimate the growth of trees in that area and generate an estimate of a future schedule of vegetation trimming.

In various embodiments, the VIMS 104 may correlate utility equipment and/or transmission line location information with images captured using various forms of image capture to identify an estimated location of electrical assets (e.g., utility equipment or transmission lines). The VIMS 104 may receive this information from the utility system 106. In one embodiment, the VIMS 104 may determine the location of transmission lines or utility equipment using feature recognition of an AI model.

In some embodiments, if the estimated height of vegetation is generally greater than or equal to a distance between the tree and an electrical asset, the VIMS 104 may identify the vegetation as a potential hazard and provide a notification to the utility system 106 of the potentially hazardous vegetation. In some embodiments, the VIMS 104 may rank the geographic areas contained within a geographic region based on the potentially hazardous vegetation and the facilities served by the utility system 106 (for example, residences, businesses, government and/or public health facilities) that are within the geographic areas. The VIMS 104 may provide notifications of the ranked geographic areas to the utility system 106.

The utility system 106 may be responsible for the management, control, and/or alerts regarding an electrical network. An electrical network is any network of transmission lines, including electrical assets for the generation, transmission, and distribution of electricity. An electrical asset is any component of the electrical network, including, for example, transmission lines, distribution stations, feeder lines, circuit spans, segments, poles, transformers, substations, towers, switches, relays, and/or the like. In some embodiments, the utility system 106 may be a utility company that owns the utility equipment and/or transmission lines, such as the Pacific Gas and Electricity Company (PG&E). Although FIG. 1 depicts a utility system 106, it will be appreciated that there may not be a utility system 106 but any system (or any number of different utility systems management by any number of related or unrelated entities) that tracks or enables management of vegetation, debris, or other asset care. Further, although FIG. 1 depicts a single utility system 106, it will be appreciated that there can be any number of utility systems 106.

Although electrical networks are specifically discussed herein, it will be appreciated that embodiments discussed herein may be applied to any infrastructure, including, for example, gas lines, pipelines, buildings, roads, highways, and/or the like.

In some embodiments, communication network 108 represents one or more computer networks (for example, LANs, WANs, and/or the like). The communication network 108 may provide communication between any of the image sources 102, the VIMS 104, and the utility system 106. In some implementations, the communication network 108 comprises computer devices, routers, cables, uses, and/or other network topologies. In some embodiments, the communication network 108 may be wired and/or wireless. In various embodiments, the communication network 108 may comprise the Internet, one or more networks that may be public, private, IP-based, non-IP based, and so forth.

Figure 2:
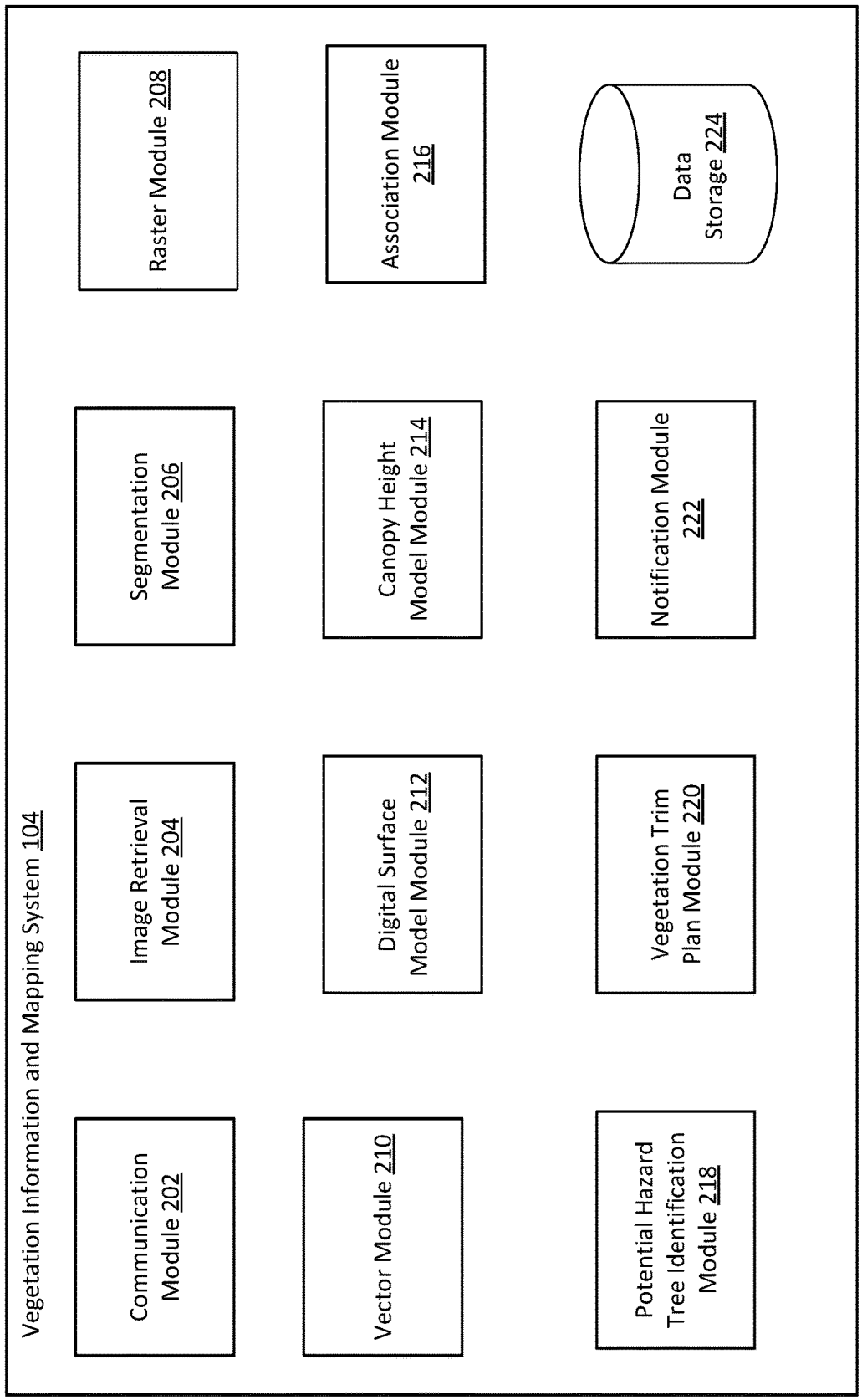
FIG. 2 depicts a block diagram of an example vegetation information and mapping system in some embodiments.

FIG. 2 depicts a block diagram of the VIMS 104 according to some embodiments. The VIMS 104 includes a communication module 202, an image retrieval module 204, a segmentation module 206, a raster module 208, a vector module 210, a digital surface model module 212, a canopy height model module 214, an association module 216, a potential hazard vegetation identification module 218, a vegetation trim plan module 220, a notification module 222, and a data storage 224.

The communication module 202 may send and receive requests or data between any of the image source 102, the VIMS 104, and the utility system 106. The communication module 202 may receive a request from a user of VIMS 104 (for example, via an interface) to request images from the image source 102. In some embodiments, the communication module 202 may provide an interface or information for a remote interface to enable a third party (for example, a utility, vegetation management company, workers, supervisors, contractors, insurance companies, and/or the like) to view and manage vegetation trimming and safety activities.

In some embodiments, the image retrieval module 204 may retrieve images or video from any number of multiple image sources 102. In one example, an image source 102 may provide satellite, aerial and/or ground-level images and video. The images or video may be captured by different devices, such as satellites, airplanes, drones, image capture devices, surveillance cameras, and the like. Commercially available satellite images from companies such as AIRBUS AERIAL may provide a user interface or a web link to download satellite images of specific geographic areas.

In various embodiments, the image retrieval module 204 may interact with one or more of the image sources 102 to retrieve different images of the same geographic area and/or different geographic areas. For example, the image retrieval module 204 may retrieve one set of images taken by satellite(s) of a geographic area that is available through a first image source 102A and other images taken by an airplane of the same geographic area that is available through a second image source 102B.

In various embodiments, the image retrieval module 204 may request images based on geographic area (for example, coordinates), location information, date ranges, quality (for example, high quality or based on resolution), enhancement, orientation, and/or the like.

In some embodiments, the image retrieval module 204 may provide an Application Programming Interface (API) call to a software application that provides satellite images. In some embodiments, the image retrieval module 204 may receive enhanced and aligned images from a satellite image source such as Google Maps. In various embodiments, the image retrieval module 204 may determine if images require enhancement. In some embodiments, the image retrieval module 204 may utilize computer vision techniques and deep learning models to determine if the quality of images may be improved.

In some embodiments, the image retrieval module 204 may optionally scan any number of images, remove noise, remove undesired markings provided by the service, improve accuracy, balance or remove color, or the like. In some embodiments, the spatial resolution of images captured by the different image sources 102 is different. The image retrieval module 204 may utilize techniques such as histogram equalization, contrast enhancement, bilinear interpolation, or some combination thereof to generate high-resolution images from low-resolution images.

In some embodiments, the segmentation module 206 generates one or more segmentation maps by providing images to multiple fully convolutional networks (FCNs) which classify pixels in the images as trees or non-trees to obtain multiple intermediate segmentation maps, and provides the multiple intermediate segmentation maps to an ensemble FCN that combines the multiple intermediate segmentation maps to obtain the one or more segmentation maps. In some embodiments, the raster module 208 generates rasters of the geographic region based on the segmentation maps and the images. In some embodiments, the vector module 210 generates vectors based on the rasters of the geographic region.

In some embodiments, the digital surface model module 212 receives digital surface models of the geographic region and the canopy height model module 214 generates canopy height models from the digital surface models. In some embodiments, the canopy height models include the heights of every pixel of the images of the geographic region. The association module 216 associates heights of pixels from the canopy height models with the polygons of vectors and stores the associated data in the data storage 224.

In various embodiments, the potential hazard vegetation identification module 218 calculates distances between vegetation such as trees and electrical assets, identifies potential hazard vegetation based on the distances and the heights of the vegetation, and provides notifications of the identification of the potential hazard vegetation. The potential hazard vegetation identification module 218 may also calculate volumes and densities of vegetation.

For the purposes of discussion, the VIMS 104 will be described herein as identifying trees, analyzing trees, and providing notifications with regard to trees (as an example of vegetation). It will be appreciated that the VIMS 104 may identify and perform analysis of any vegetation, including any number of different types of vegetation (not just trees but also including shrubs, bushes, vines, and/or the like). For example, the potential hazard vegetation identification module 218 may calculate distances between trees and electrical assets, identifies potential hazard trees based on the distances and the heights of the trees, and provides notifications of the identification of the potential hazard trees. The potential hazard vegetation identification module 218 may also calculate volumes and densities of trees.

In some embodiments, the vegetation trim plan module 220 utilizes information about potential hazard trees and facilities within geographic areas to rank geographic areas in terms of priority, and utilize such ranking to modify vegetation trim plans for the geographic areas.

In some embodiments, the notification module 222 provides notifications of identifications of trees (and/or any vegetation) as potential hazards, of ranked geographic areas, and of modified vegetation trim plans.

In various embodiments, the data storage 224 includes data stored, accessed, and/or modified by any of the modules of the VIMS 104. The data storage 224 may be or include any data structures, such as tables, lists, databases, and/or any other structures.

A module may be hardware, software, firmware, or any combination. For example, each module may include functions performed by dedicated hardware (e.g., an Application-Specific Integrated Circuit (ASIC), a Field Programmable Gate Array (FPGA), or the like), software, instructions maintained in ROM, and/or any combination.

FIG. 3 is a flow chart showing a method 300 for identifying vegetation (such as trees) as potential hazards and providing a notification in some embodiments. The method 300 may be understood as including multiple phases. For example, in some embodiments, a first phase may be understood as performing two-dimensional (2D) modeling of vegetation. The first phase may include the steps of receiving mono georeferenced satellite images of a geographic region (step 302), generating segmentation maps using an ensemble of fully convolutional networks (step 304), generating rasters (step 306), and generating vectors (step 308).

The following discussion refers specifically to trees but it will be appreciated that the method may be applied to any vegetation including different types of vegetation (i.e., the method is not limited to trees).

The method 300 begins with step 302, where the image retrieval module 204 receives a set of georeferenced satellite images of a geographic region. The geographic region may include multiple geographic areas, and the multiple geographic areas may include multiple electrical assets of one or more power distribution infrastructures. A georeferenced satellite image, which is in the form of a rectangle, includes the coordinates of the top-left vertex and the bottom-right vertex of the rectangle. Accordingly, the coordinate of each pixel in the georeferenced satellite image may be determined using the vertex coordinates and the resolution of the georeferenced satellite images. The georeferenced satellite images may be mono, where a satellite captures one image of a particular area. Alternatively, the georeferenced satellite images may be stereo, where the satellite captures two images of a particular area from two different angles at approximately the same time. As described further herein, for example, with reference to FIG. 8, the digital surface model module 212 may use georeferenced stereo satellite images to create digital surface models.

At step 304, the segmentation module 206 generates segmentation maps by providing the set of georeferenced mono satellite images to one or more fully convolutional networks (FCNs). In some embodiments, the segmentation module 206 uses multiple FCNs, each of which is trained on data from a different georeferenced satellite image provider, and utilizes another FCN (termed an ensemble FCN) to combine the output of each of the multiple FCNs. In such embodiments, the segmentation module 206 may provide the output of each of the multiple FCNs as input to the ensemble FCN. The ensemble FCN combines the output of each of the multiple FCNs so as to produce a segmentation map that is more accurate than that which would be produced by a single one of the multiple FCNs. An example architecture of one of the multiple FCNs that the segmentation module 206 may use is described with reference to, for example, FIG. 5A. An example architecture of an ensemble FCN that the segmentation module 206 may use to combine the outputs of each of the multiple FCNs is described with reference to, for example, FIG. 5B.

In some embodiments, the segmentation module 206 utilizes a single FCN to perform the segmentation. In such embodiments, the single FCN may not necessarily be as accurate as the ensemble FCN, but may be selected for various reasons, such as ease of use, reduction in training time, and/or reduction in inference time.

Figure 7A:
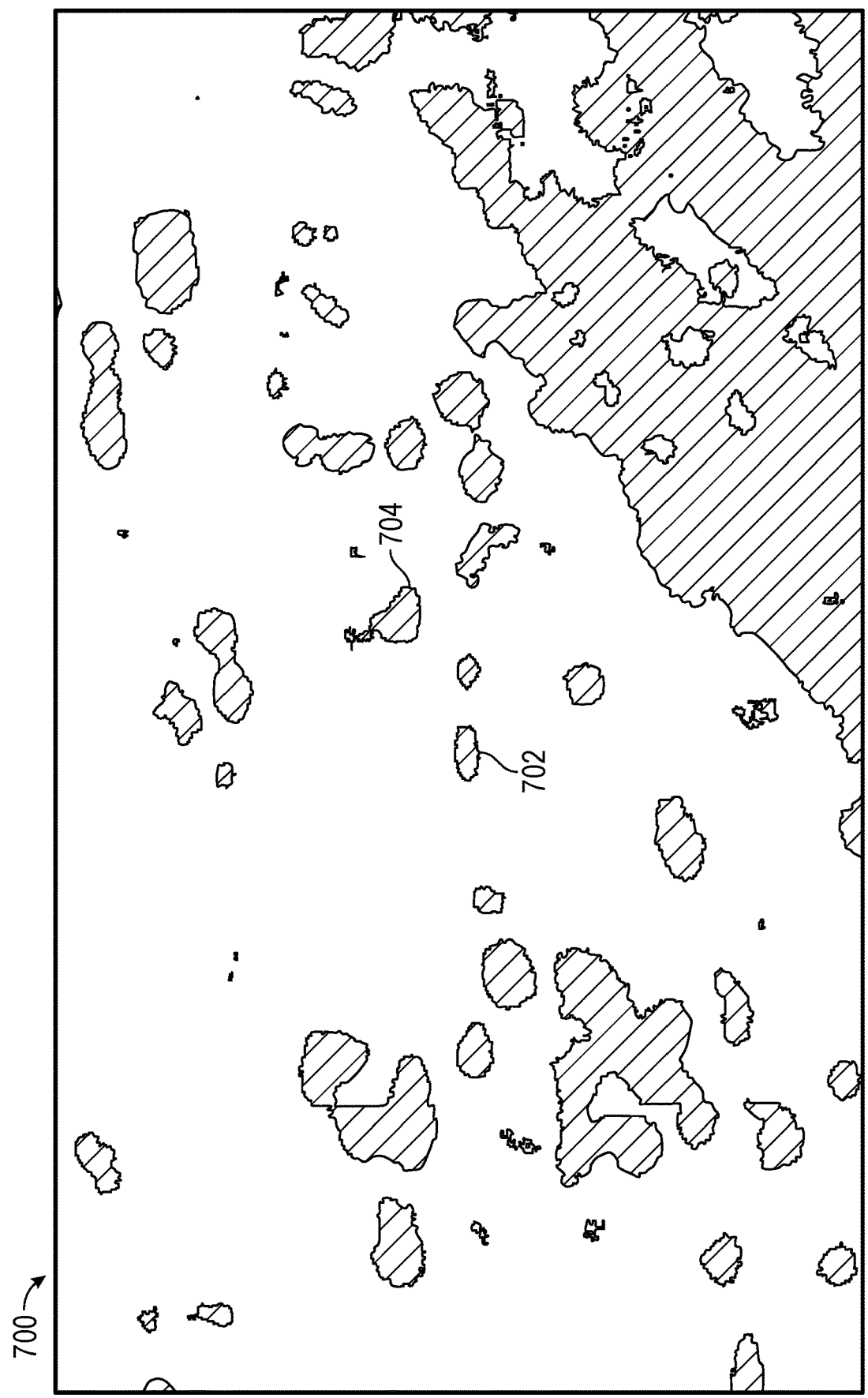
FIG. 7A depicts a raster of a particular geographic area in some embodiments.

At step 306, the raster module 208 generates one or more rasters of the geographic region based on the segmentation map and the set of georeferenced satellite images. A raster is an image that has metadata of coordinates usable to determine the locations of the pixels in the images. The raster module 208 may utilize a particular algorithm for locating each pixel in the raster based on the dimensions and location information of the georeferenced satellite images. FIG. 7A depicts a raster 700 of a particular geographic area in some embodiments. The segmentation module 206 has performed a binary classification of each pixel in the raster 700 as either a tree or not a tree (and/or vegetation or non-vegetation). The raster module 208 groups tree pixels as trees, such as tree 702 and tree 704. The raster 700 includes other trees which are not labeled with reference numbers.

Figure 7B:
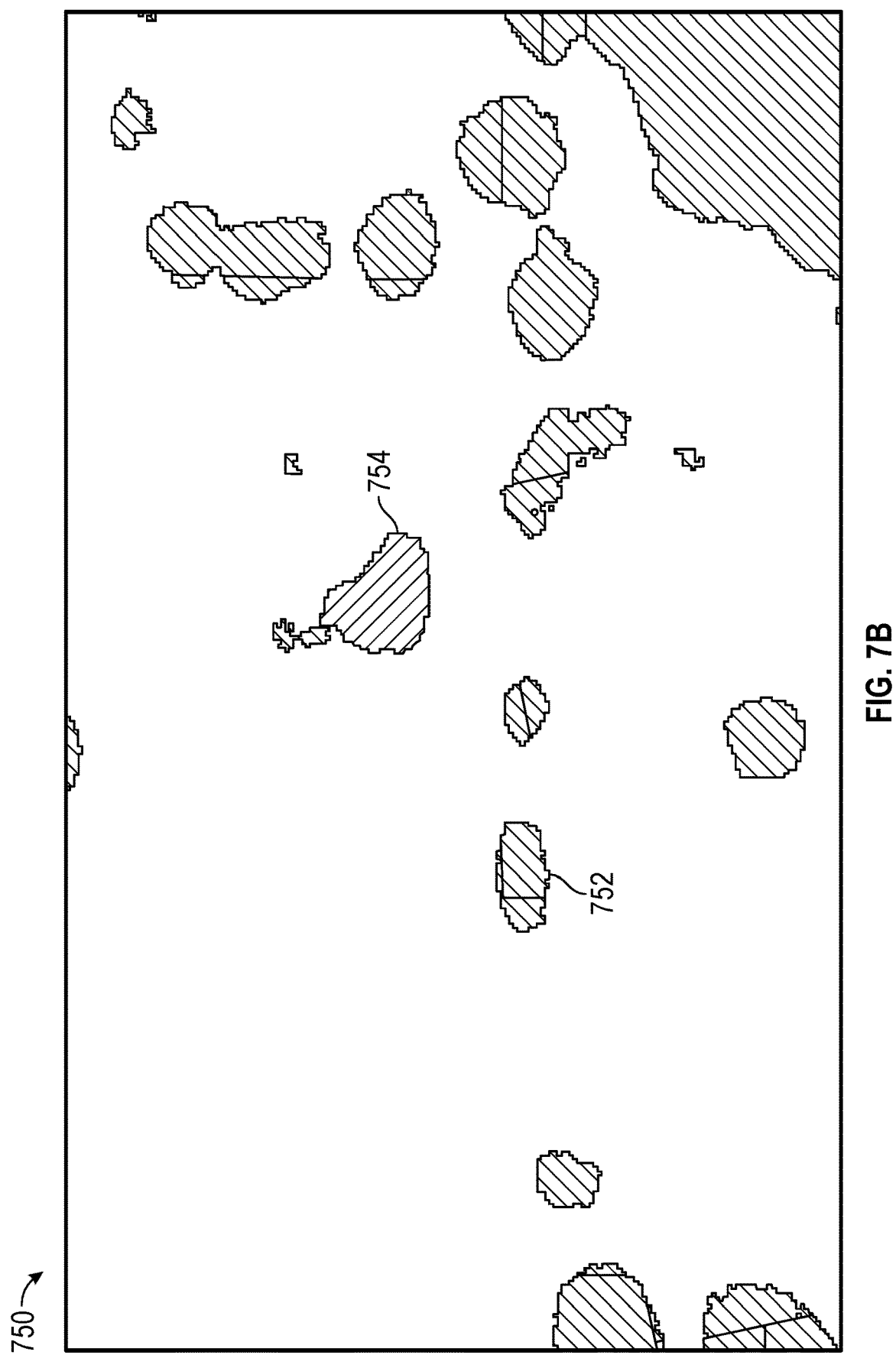
FIG. 7B depicts an image representation of a vector in some embodiments.

Returning to FIG. 3, at step 308, the vector module 210 generates one or more vectors based on the one or more rasters of the geographic region. A vector includes one or more polygons (or a linestream or a single point), with a polygon representing a tree and having a set of coordinates that define the polygon. FIG. 7B depicts an image representation of a vector 750 in some embodiments. The vector 750 includes multiple polygons, such as polygon 752 (corresponding to tree 702 in FIG. 7A) and polygon 754 (corresponding to tree 704 in FIG. 7A). Because a polygon is defined by a set of coordinates, it is possible for the vector module 210 to calculate the two-dimensional surface area of the polygon (a calculated area), which is an estimate of the tree crown area.

Returning to FIG. 3, in some embodiments, a second phase of the method 300 may be understood as three-dimensional (3D) modeling. The second phase may include receiving georeferenced stereo satellite images of the geographic region (step 302), receiving digital surface models of the geographic region (step 310), and generating canopy height models (step 312). The outputs of the first phase and the second phase may be used to associate heights of trees with polygons of vectors (step 314).

At step 310, the digital surface model module 212 receives digital surface models of the geographic region. In some embodiments, the image retrieval module 204 receives a set of georeferenced stereo satellite images of a geographic region (step 302). The digital surface model module 212 uses the georeferenced stereo satellite images to produce disparity maps, and uses the disparity maps to generate the digital surface models. In other embodiments, the digital surface model module 212 receives digital surface models that have been generated by a third-party system. In such embodiments, the digital surface model module 212 may not necessarily need to receive georeferenced stereo satellite images. In some embodiments, the digital surface model module 212 receives digital surface models for a first portion of the geographic region, and generates digital surface models for a second portion of the geographic region from georeferenced stereo satellite images.

A digital surface model is a raster. For digital surface models, in general, a pixel is either an object pixel (such as a tree, a building, a vehicle, or other obstruction) or a ground pixel. Digital surface models include heights of pixels, and ground elevation and object heights are given in terms of difference with mean sea level (MSL). That is, a digital surface model gives the height of an object as the sum of the elevation of the ground and the height of the object on the ground. For example for a tree at a ground elevation of 200 m having a height of 10 m, the digital surface model would give the tree height as 210 m.

In step 312, the canopy height model module 214 generates canopy height models. A canopy height model may be created from a digital surface model and a digital terrain model. A digital terrain model gives the ground elevation, without the height of objects on the ground, in terms of difference with MSL. One technical problem is that digital surface models and digital terrain models may not be calibrated in the same way. Using digital surface models and digital terrain models that are not calibrated in the same way may not produce accurate results. This is because a digital surface model calibrated according to one technique may give different ground elevations and heights for objects than a digital surface model calibrated according to a different technique. Therefore, using a digital terrain model derived a digital surface model calibrated one way and another digital surface model calibrated another way to calculate a canopy height model may not give ground elevations and object heights that meet a required level of accuracy (that is, outside of a prescribed acceptable error range). Typically, different third-parties use different calibration techniques in generating their digital surface models, but even digital surface models and digital terrain models produced by the same third-party may not be calibrated the same way and thus may not be usable to generate canopy height models to a required degree of accuracy. Accordingly, it may be difficult to generate a canopy height model that provides elevations to a prescribed accuracy (for example +/−approximately 2-3 feet).

Figure 8:
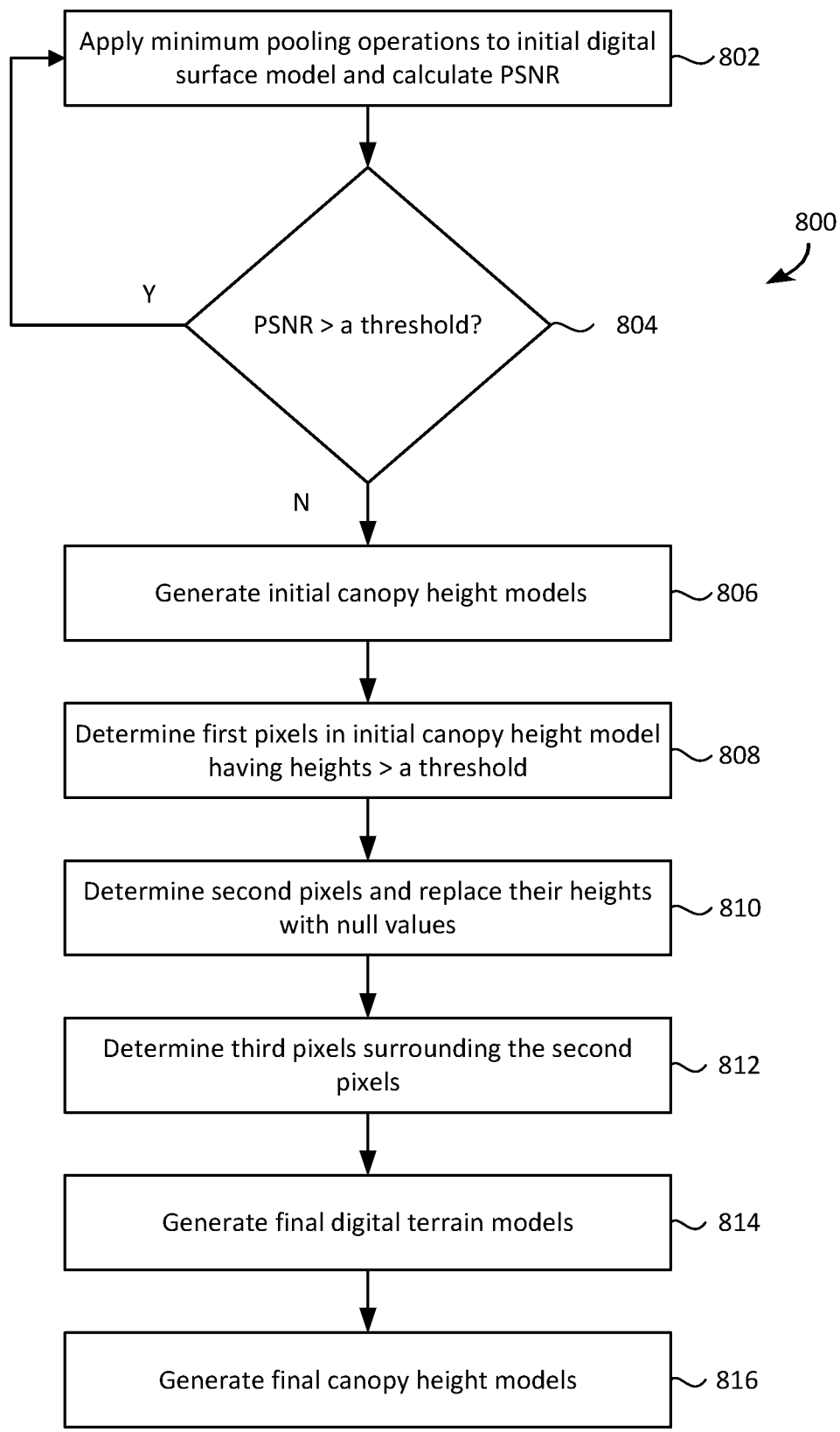
FIG. 8 is a flow chart showing a method for generating canopy height models in some embodiments.

FIG. 8 is a flow chart showing a method 800 for generating canopy height models in some embodiments that provides technical solutions to the aforementioned technical problems. The method begins at step 802 where the canopy height model module 214 applies minimum pooling operations to the digital surface models that the digital surface model module 212 received in step 310, thereby obtaining initial digital terrain models. Also in step 802, the canopy height model module 214 calculates a peak signal to noise ratio (a calculated peak signal to noise ratio, a calculated PSNR) of the initial digital terrain models to the digital surface models. In step 804, the canopy height model module 214 compares the calculated PSNR to a predetermined first threshold. If the PSNR is still greater than the predetermined first threshold (does not exceed the predetermined first threshold), the method 800 returns to step 802. If not, then the method 800 proceeds to step 806, where the canopy height model module 214 then generates initial canopy height models by subtracting the initial digital terrain models from the digital surface models. At step 808, the canopy height model module 214 determines first pixels in the initial canopy height models that have heights greater than a predetermined second threshold, such as a threshold that is approximately 1.5 m to approximately 2.0 m. It will be appreciated that the thresholds may be any value.

At the first pixels in the initial canopy height models, there may be an object, such as a tree, a building, vehicle, or other obstruction. Accordingly, the first pixels may be referred to as object pixels. The heights of the first pixels in the digital surface models is the sum of the elevation of the ground and the height of an object on the ground from MSL.

In step 810, the canopy height model module 214 determines second pixels in the one or more initial digital terrain models that correspond to the first pixels. Also in step 810, the canopy height model module 214 replaces heights of the second pixels with null values. At step 812 the canopy height model module 214 determines third pixels surrounding the second pixels in the one or more initial digital terrain models. The third pixels may be pixels surrounding the object pixels that have heights less than the predetermined second threshold of approximately 1.5 m to approximately 2.0 m. Accordingly, the third pixels may be referred to as ground pixels. At step 814 the canopy height model module 214 generates one or more final digital terrain models by interpolating heights from the heights of the third pixels, and replacing the heights of the second pixels with the interpolated heights. At step 816 the canopy height model module 214 generates the canopy height models of the geographic region by subtracting the final digital terrain models from the digital surface models. The method 800 then concludes.

Although the example in FIG. 8 refers to pixels, it will be appreciated that any portion or unit of an image may be used.

Accordingly, the method 800 provides a technical solution to the foregoing technical problem of obtaining canopy height models that provide elevations to a desired degree of accuracy. One advantage of the method 800 is that the digital terrain models are calibrated in the same way as the digital surface models, thereby ensuring more accurate heights in the canopy height models. Another advantage is that because canopy height model module 214 generates the digital terrain models, the need to obtain digital terrain models from a third-party is obviated.

Returning to FIG. 3, the canopy height models generated by the canopy height model module 214 are rasters in which every pixel has coordinates and a height value. In step 314, the association module 216 associates one or more heights of pixels from the canopy height models with the polygons of vectors and stores the associated data in the data storage 224. This allows for the association module 216 to associate every polygon with one or more heights. In some embodiments, the association module 216 associates a particular polygon with a maximum height of all the pixels encompassed by the polygon. In some embodiments, additionally or alternatively, the association module 216 associates a particular polygon with values representing one or more of the 99th, 98th, 95th, and 90th percentiles of all the pixels encompassed by the polygon. In some embodiments, the association module 216 associates a particular polygon with any value derived from the heights of all the pixels encompassed by the polygon, such as the average, or the mean, of all such pixel heights.

Figure 9A:
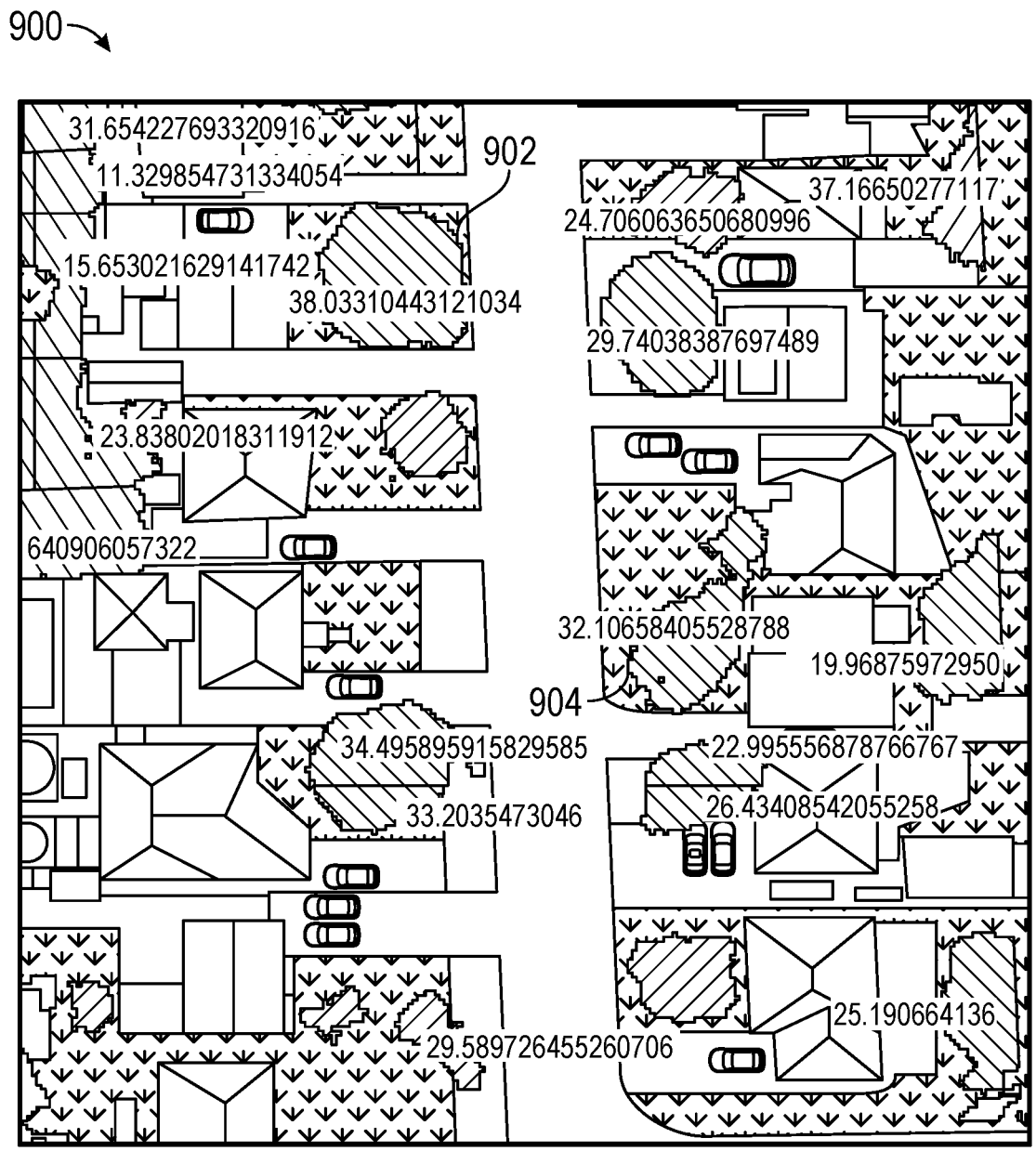
FIGS. 9A and 9B depict interfaces that may be generated to show trees and their heights in some embodiments.
Figure 9B:
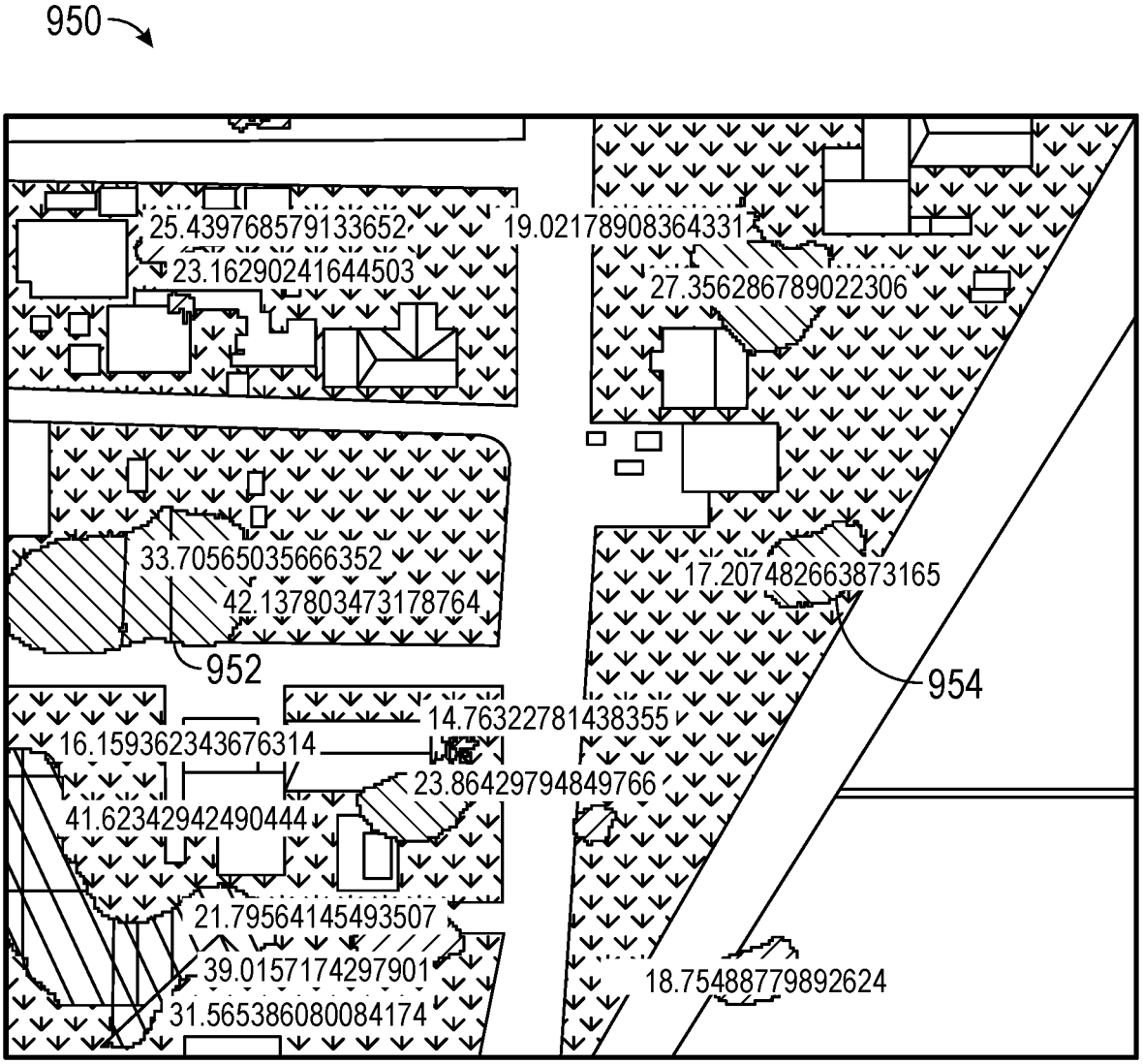

FIGS. 9A and 9B depict interface 900 and interface 950, respectively, that the notification module 222 may generate and display to show trees (or any combination of vegetation) and their heights in some embodiments. Interface 900 depicts multiple trees that have their maximum height shown, such as tree 902 and tree 904. Interface 950 also depicts multiple trees that have their maximum height shown, such as tree 952 and tree 954. The notification module 222 may color trees differently to distinguish them from one another (the different colors are shown as different hashing in FIGS. 9A and 9B). In some embodiments, the notification module 222 may display other tree height values, such as the 99th percentile height or the average height.

Returning to FIG. 3, in some embodiments, a third phase of the method 300 may be understood as identifying trees as potential hazards and providing notifications. The third phase may include calculating distances between polygons and electrical assets (step 316), comparing a height of a polygon to a calculated distance between the polygon and an electrical asset (step 318), identifying a tree represented by the polygon as a potential hazard if the height is generally greater than or equal to the calculated distance (step 320), and providing a notification of the tree as a potential hazard (step 322).

At step 316 the potential hazard vegetation identification module 218 calculates distances between polygons and electrical assets of the power distribution infrastructures. In step 318, the potential hazard vegetation identification module 218 then compares distances and heights of the polygons. In some embodiments, the potential hazard vegetation identification module 218 uses maximum heights of the polygons in the comparisons. At step 320, based on the comparing of the distances and heights of the polygons, the potential hazard vegetation identification module 218 identifies trees that may be potential hazards. For example, if the potential hazard vegetation identification module 218 determines that the height of a particular polygon is generally greater than or equal to the distance from the particular polygon to a particular electrical asset, then the potential hazard vegetation identification module 218 may identify that the tree represented by the particular polygon is a potential hazard. This is because the tree has the potential to impact the electrical asset if the tree falls for some reason, due to the fact the tree height is generally greater than or equal to the distance between the tree and the electrical asset. The tree is a risk to the electrical asset, which may be an electrical powerline, and accordingly, the potential hazard vegetation identification module 218 identifies the tree as a potential hazard.

In some embodiments, the potential hazard vegetation identification module 218 uses a triangle formed by points corresponding to a top of the tree, a bottom of the tree, and the bottom of the electrical asset to identify a tree as a potential hazard. To do so, the potential hazard vegetation identification module 218 may identify a pixel corresponding to an estimated center of mass of the polygon representing the tree and calculate a distance from this identified pixel to the electrical asset. The potential hazard vegetation identification module 218 then may calculate the hypotenuse (a calculated hypotenuse) of the right triangle formed by the distance and the height of the tree.

In some embodiments, the potential hazard vegetation identification module 218 calculates a volume of the tree. The potential hazard vegetation identification module 218 may use the two-dimensional surface area of the polygon representing the tree that may be calculated by the vector module 210 and the maximum height of the tree to calculate the volume of the tree. The potential hazard vegetation identification module 218 may use the formula for the volume of a cone, $V=\frac{1}{3}\pi r^2 h$, to calculate the volume of the tree. In doing so, the potential hazard vegetation identification module 218 assumes that the tree has a generally conical shape. In some embodiments, the potential hazard vegetation identification module 218 identifies a species of the tree and utilizes the species of the tree in calculating the volume of the tree as well as the density of the tree. For example, certain species may have a generally spherical shape. Other species may have a generally cylindrical shape. The species of trees may be determined using AI and stored in the data storage 224. The potential hazard vegetation identification module 218 may access the data storage 224 to obtain the species of a particular tree, and use a volume formula for the shape corresponding to the species in order to calculate the volume of the particular tree. In some embodiments, the potential hazard vegetation identification module 218 may access the data storage 224 to obtain a mass of a tree using the species of the tree. For example, the data storage 224 may include data relating tree height and/or tree area to tree mass. The potential hazard vegetation identification module 218 may calculate the tree density using the tree mass and the tree volume.

At step 322, the notification module 222 provides a notification of the tree as a potential hazard. The notification module 222 may provide the notification in the form of an email or other text-based message, a spreadsheet listing potential hazard trees, or a map which has as a layer the identified potential hazard trees. It will be appreciated that the notification module 222 may use a variety of means of providing notifications.

A utility that operates a power distribution infrastructure generally has one or more power stations that generate electricity. The electrical powerlines that extend out from a power station and provide for the transmission of electricity to a city, county, geographic area, or the like, are collectively known as a feeder. A utility may have one or more vegetation trim plans that specify a frequency according to which the utility trims vegetation, such as trees, near the feeders. The utility may determine the frequency of occurrence (for example, every three years, every four years, etc.) by examining the current distribution of vegetation proximate to the feeders. This may require the utility to send out personnel to make ground surveys of vegetation, which may be inefficient and/or costly. This approach may also result in the vegetation near certain feeders being trimmed too frequently and/or the vegetation near other feeders being trimmed not frequently enough.

A fourth phase of the method 300 may provide solutions to these potential problems. In some embodiments, the method 300 may be understood as including determining the facilities within the geographic areas (step 324), ranking the multiple geographic areas (step 326), modifying vegetation trim plans (step 328), and providing notifications of the ranked geographic areas and/or the modified vegetation trim plans (step 330). The method 300 allows for ranking based on the vegetation (e.g., trees) identified as potential hazards that are within the multiple geographic areas as well as the facilities served by the feeders within each geographic area. Such facilities may include residences, businesses, factories, schools, hospitals, and any other facilities to which the utility provides electrical power.

Figure 10:
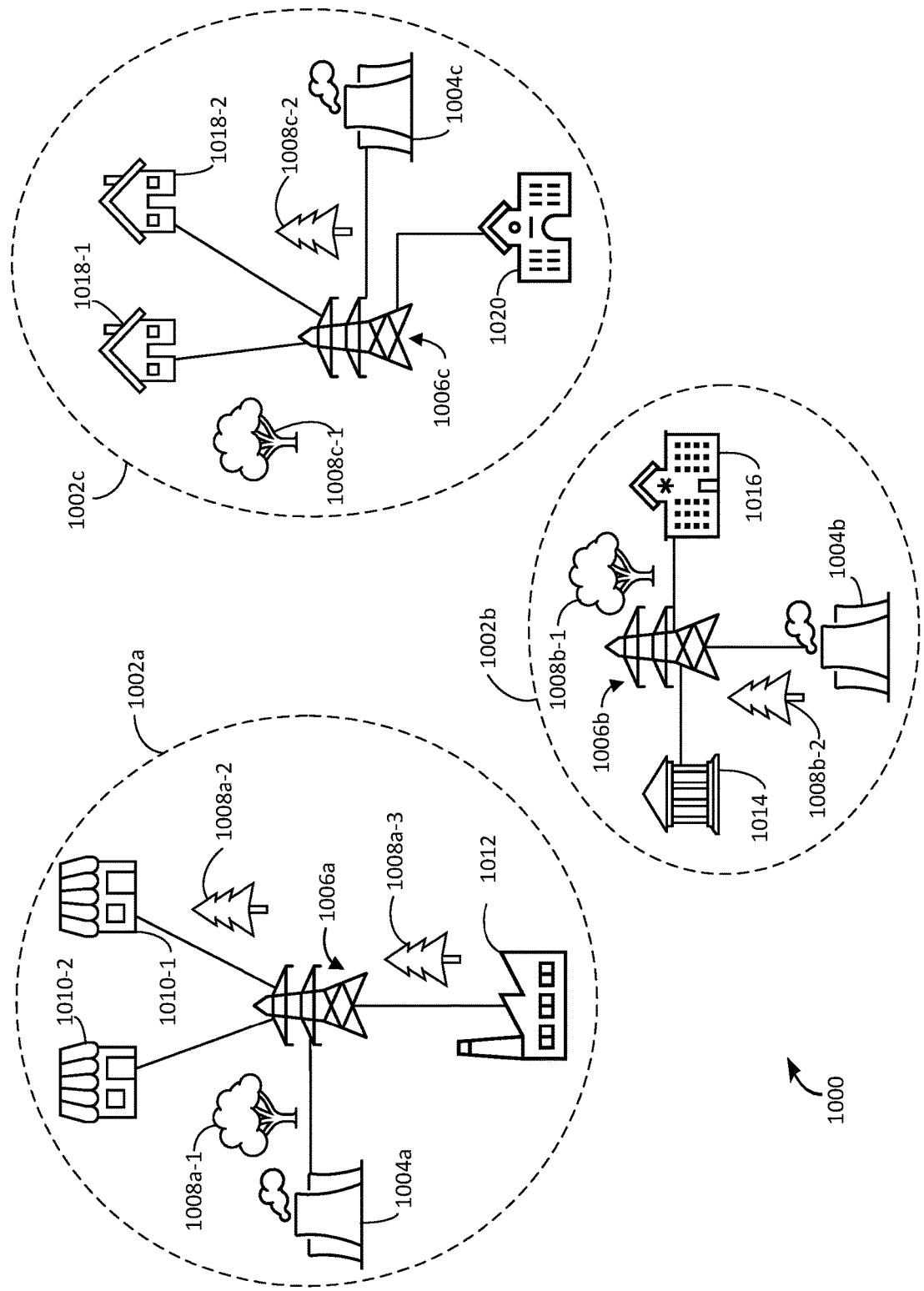
FIG. 10 illustrates a geographic region containing multiple geographic areas in some embodiments.

FIG. 10 illustrates a geographic region 1000 that includes multiple geographic areas 1002 (shown individually as geographic areas 1002a-c). Each geographic area 1002 includes multiple electrical assets, such as a power station 1004 (shown individually as power stations 1004a-c) and feeders 1006 (shown individually as feeders 1006a-c). Each feeder 1006 has vegetation such as trees 1008 proximate to it (shown individually as trees $1008a1$-$a3$, $1008b1$-$b3$, and $1008c1$-$c3$). The power station 1004a transmits electricity via feeder 1006a to retail establishments 1010 (shown individually as retail establishment 1010-1 and retail establishment 1010-2) and factory 1012. The power station 1004b transmits electricity via feeder 1006b to government building 1014 and hospital 1016. The power station 1004c transmits electricity via feeder 1006c to residences 1018 (shown individually as residences 1018-1 and 1018-2) and school 1020.

Returning to FIG. 3, at step 324, the vegetation trim plan module 220 accesses data storage 224 to determine the facilities served by the power station 1004 in each geographic area 1002. The vegetation trim plan module 220 may access any information about the facilities, such as the type of facility (for example, single-family homes, schools, factories, and hospitals), the zoning type(s) of the geographic area (for example, commercial, residential, industrial, and agricultural), and the number of facilities in the geographic area (for example, the number of homes or businesses). The vegetation trim plan module 220 also accesses information about potential hazard trees that the potential hazard vegetation identification module 218 identified. At step 326, the vegetation trim plan module 220 may utilize facility information, potential hazard tree information, and/or other information to rank the geographic areas 1002 in terms of priority. In this context, ranking may include filtering, sorting, and/or thresholding the geographic areas 1002 so as to ensure that the geographic areas that may suffer the most severe impacts from outages due to trees falling on powerlines are prioritized.

The vegetation trim plan module 220 may prioritize geographic areas that include facilities that are critical to the economy such as factories (for example, factory 1012 in geographic area 1002a). Additionally or alternatively, the vegetation trim plan module 220 may prioritize geographic areas that include facilities that are critical to public safety or health such as government buildings and hospitals (for example, government building 1014 and hospital 1016 in geographic area 1002b, or school 1020 in geographic area 1002c). The vegetation trim plan module 220 may prioritize such geographic areas, even though their feeders may be at a lower risk of damage due to trees falling on them, because of their importance to public safety, health, and/or the economy.

The vegetation trim plan module 220 may utilize confidence values or confidence intervals of the multiple FCNs 500 and/or an ensemble FCN 550 discussed with reference to, for example FIGS. 5A and 5B in ranking geographic areas. For example, the segmentation maps generated by the segmentation module 206 for a first geographic area may have high confidence values associated with them, meaning that there is a high degree of confidence that the segmentation of pixels as trees or non-trees matches ground truth. If there are few potential hazard trees in this first geographic area, the vegetation trim plan module 220 may downrank this first geographic area. As another example, there may be low confidence values associated with the segmentation maps generated by the segmentation module 206 for a second geographic area. The vegetation trim plan module 220 may uprank this second geographic area regardless of the number of potential hazard trees in it simply due to the relatively low confidence in the segmentation of pixels as trees or non-trees.

At step 328, the vegetation trim plan module 220 may then modify the vegetation trim plans for certain of the geographic areas 1002 in order to cause the trees in the certain geographic areas to be trimmed more frequently. The vegetation trim plan module 220 may make such modifications because electrical outages in such geographic areas 1002 could have devastating impacts to public safety, health, and/or the economy. At step 330 the notification module 222 provides a notification of the ranked geographic areas and/or a notification of the modified vegetation trim plans. The notification module 222 may provide the notification in the form of an email or other text-based message, a spreadsheet listing ranked geographic areas and/or modified vegetation trim plans, or a map which has as a layer the ranked geographic areas and/or modified vegetation trim plans. Those of skill in the art will understand that the notification module 222 may use a variety of means of providing notifications.

One advantage of the method 300 is that it allows for a scalable and accurate identification of trees across any geographic region on Earth and the storing of digital representations (in the form of polygons) of trees and tree parameters such as tree crown area. Another advantage of the method 300 is that it enables an accurate estimation of tree heights and other tree parameters such as tree volume and tree density. In some embodiments, another advantage of the method 300 is that it allows for an identification of potential hazard trees based on tree heights and distances to electrical assets and for the sending of notifications of the identification of potential hazard trees. Another advantage of the method 300 may be that it allows for a ranking of geographic areas based on potential hazard trees and facilities connected to electrical assets within the geographic areas and a modification of vegetation trim plans of the geographic areas based on the ranking, and notifications thereof to be sent. Other advantages of the method 300 will be apparent to those of skill in the art.

Generating a Segmentation Map Using Multiple FCNs and an Ensemble FCN

As described with reference to, for example, FIG. 2, the VIMS 104 may receive images, such as satellite images, from different third-parties. For example, the image retrieval module 204 may receive georeferenced satellite images from multiple satellite image third parties. However, the georeferenced satellite images may not necessarily be uniform in all their characteristics or parameters. For example, a particular satellite image third party may provide georeferenced satellite images that have a particular contrast or resolution. Another satellite image third-party may provide georeferenced satellite images at a different contrast or resolution and/or a different illumination angle. For example, a set of georeferenced satellite images from a first satellite image third party may have intensity values ranging from 0 lux to 1000 lux. Another set of georeferenced satellite images from a first satellite image third party may have intensity values ranging from 0 lux to 5 lux. Accordingly, there can be significant differences in the characteristics and/or parameters of georeferenced satellite images that the image retrieval module 204 receives. These significant differences may be such that using a single neural network to perform tree segmentation may provide results that do not meet a required level of accuracy. Accordingly, it would be useful to have a framework that is robust enough to be able to perform tree segmentation to a desired level of accuracy using heterogenous georeferenced satellite images.

In some embodiments, the segmentation module 206 uses multiple neural networks, such as multiple FCNs, to perform vegetation segmentation, and an ensemble FCN to combine the outputs of the multiple FCN. Each of the multiple FCNs has been trained on georeferenced satellite images from a particular satellite image third party. For example, a first FCN is trained on georeferenced satellite images from a first satellite image third party, a second FCN is trained on georeferenced satellite images from a second satellite image third party, and so forth. Each of the multiple FCNs may therefore be trained so as to perform tree segmentation to a required degree of accuracy on the georeferenced satellite images from a particular satellite image third-party. Due to this particularized training, one of the multiple FCNs may not necessarily perform tree segmentation to the required degree of accuracy on the georeferenced satellite images from the other satellite image third-parties. To overcome this particular technical problem, the segmentation module 206 uses a single neural network, termed an ensemble FCN, to combine the output of the multiple FCNs and to generate the one or more segmentation maps that the raster module 208 uses to generate the one or more rasters.

Figure 5A:
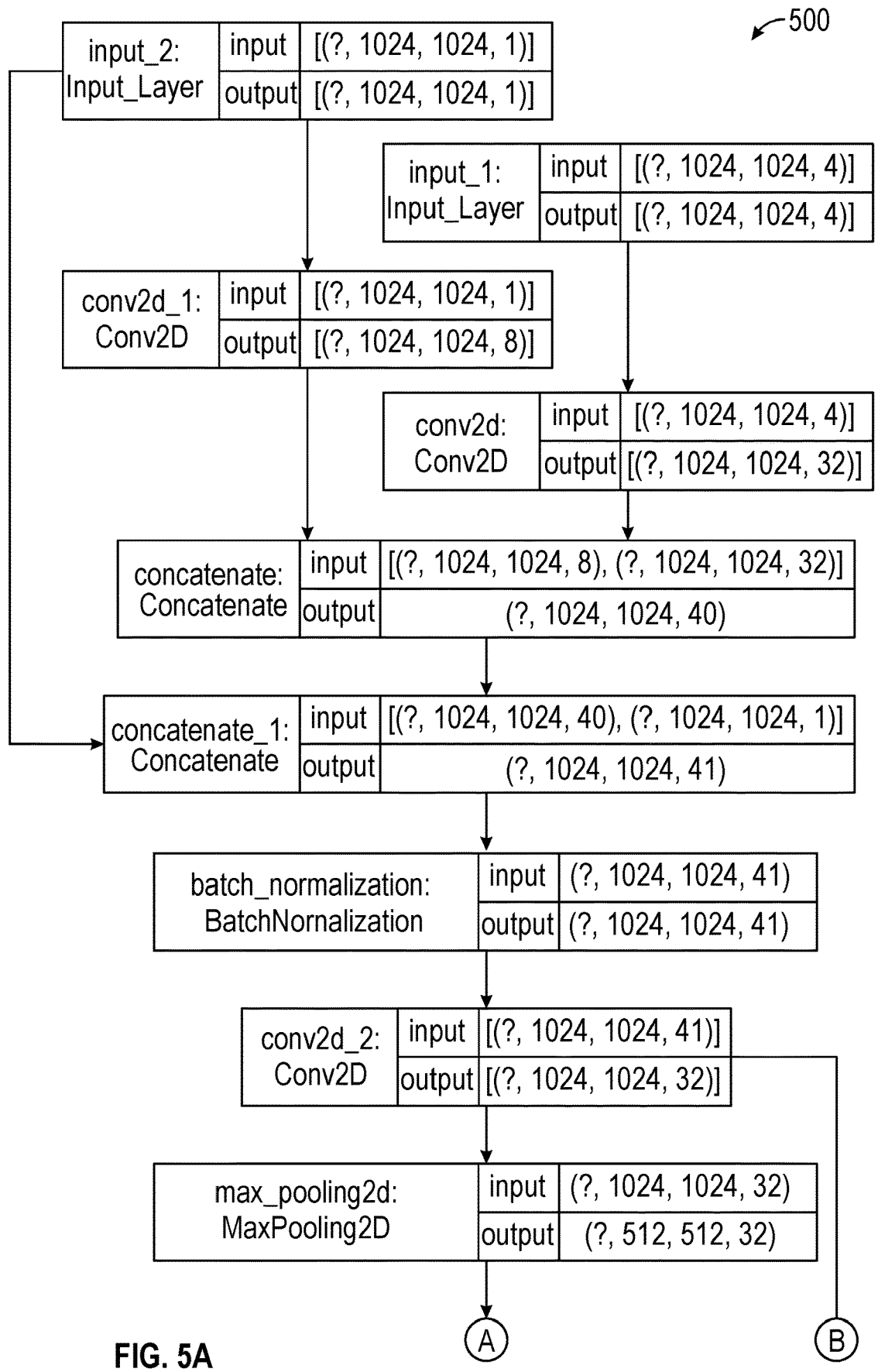
FIG. 5A depicts an architecture of a fully convolutional network that may be used to perform tree segmentation in some embodiments.
Figure 5A:
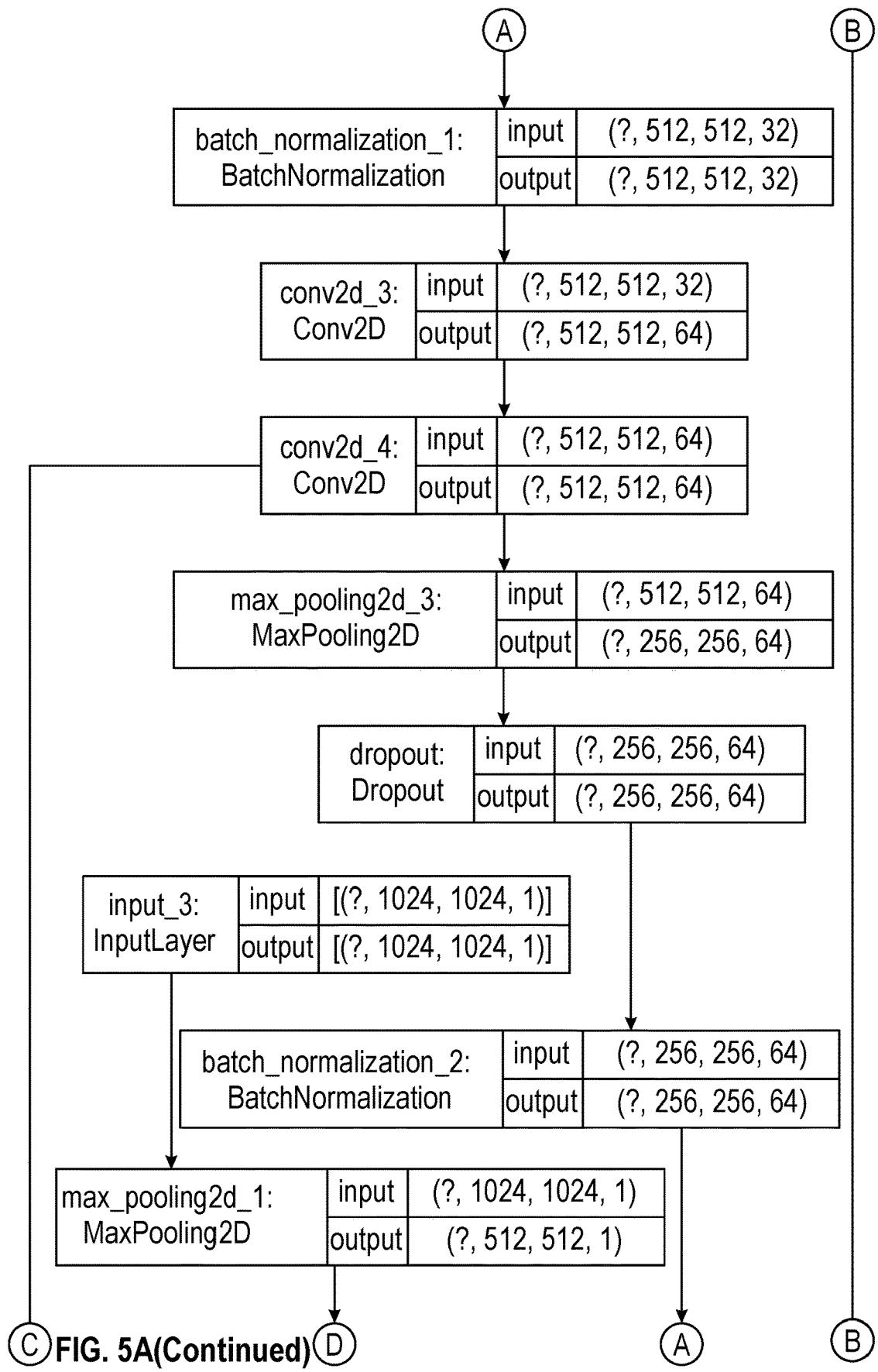
Figure 5A:
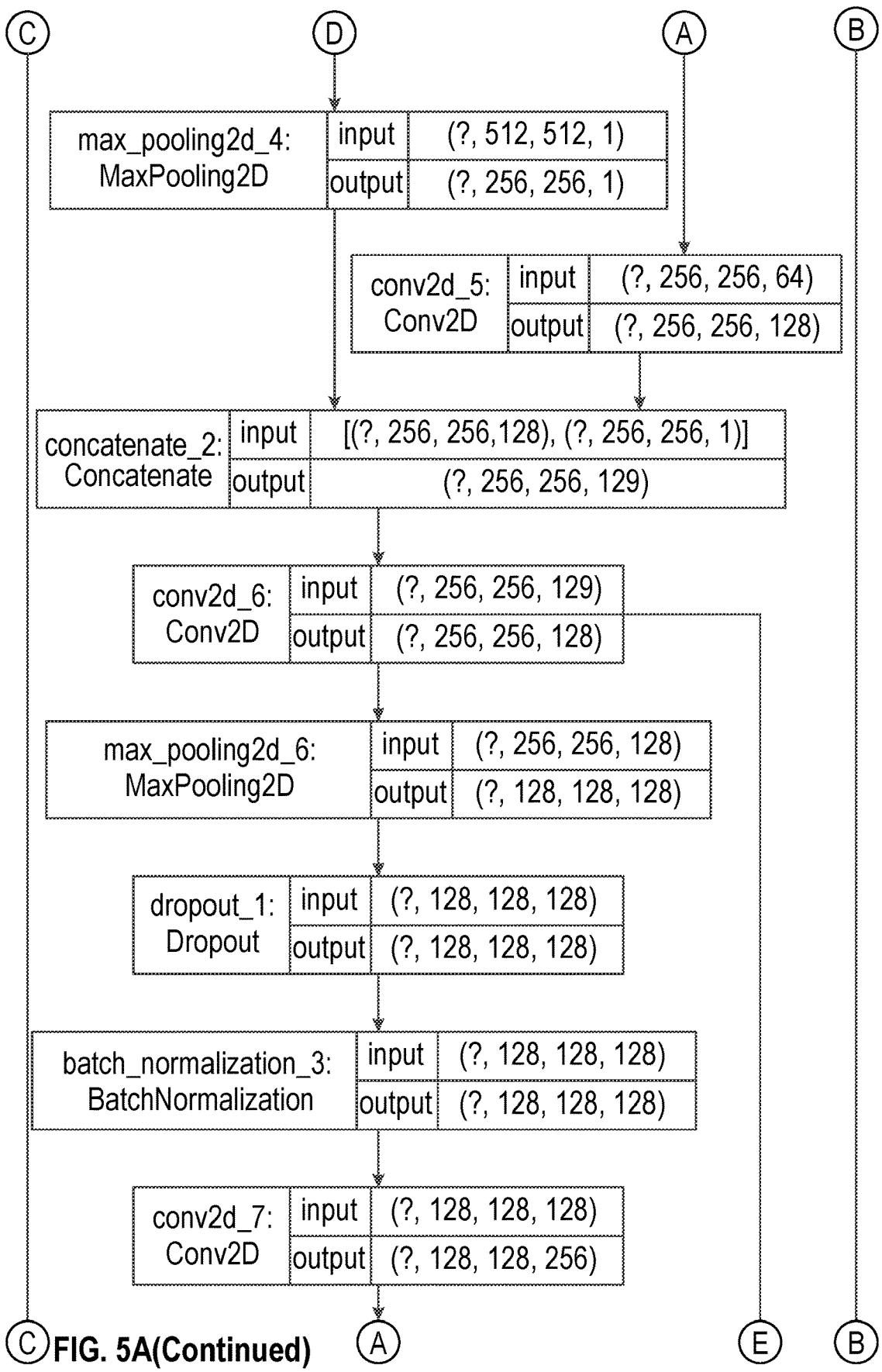
Figure 5A:
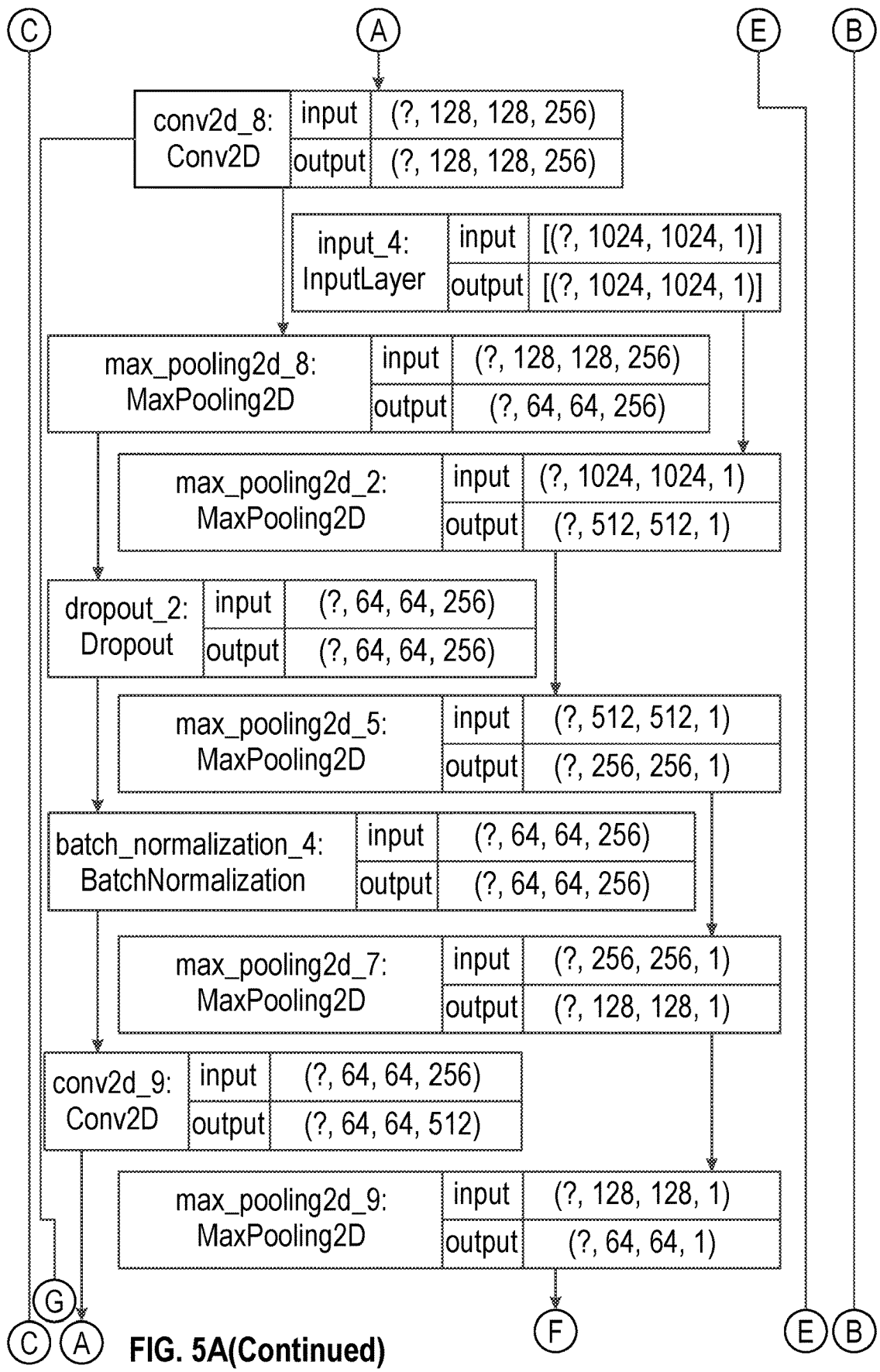
Figure 5A:
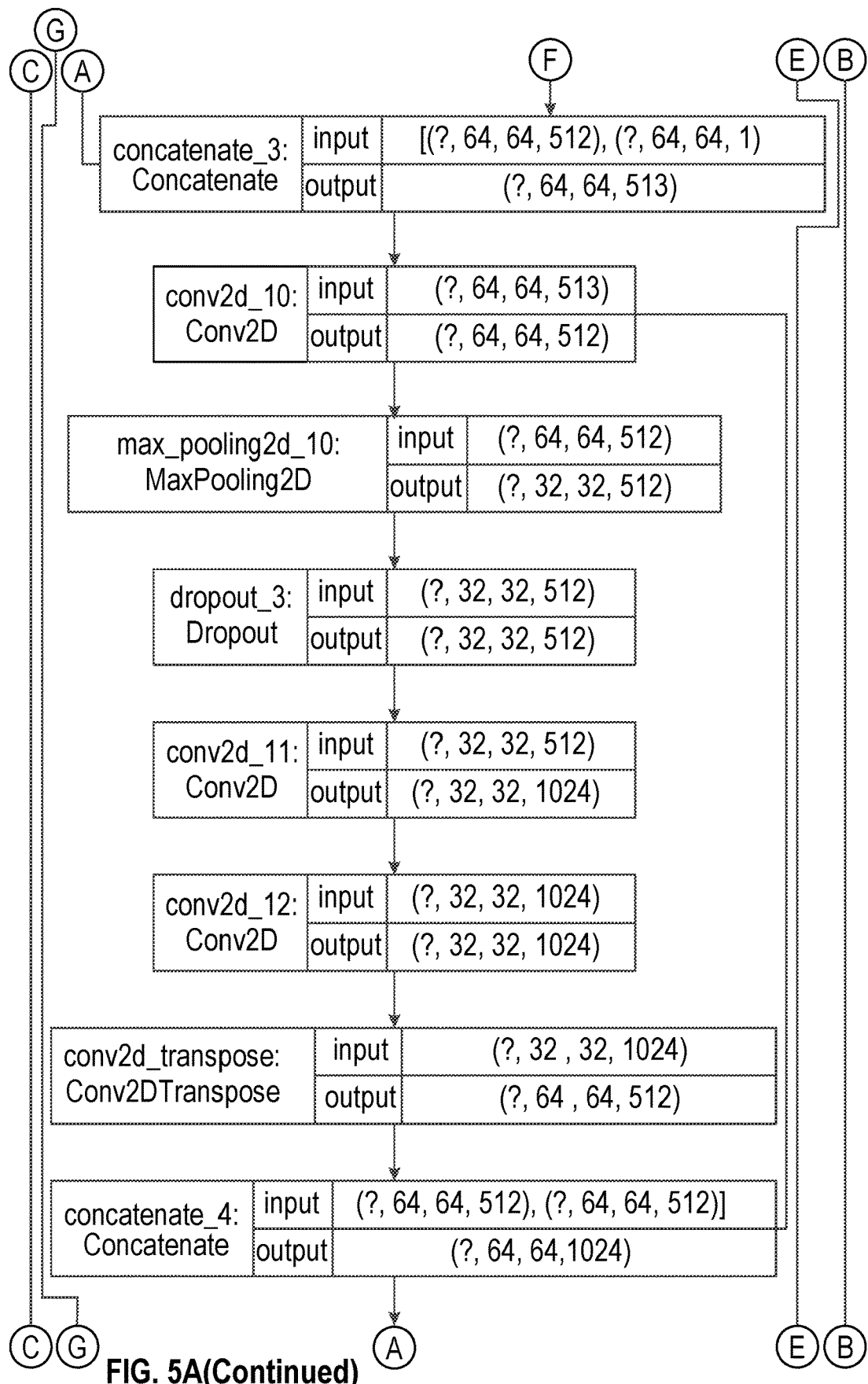
Figure 5A:
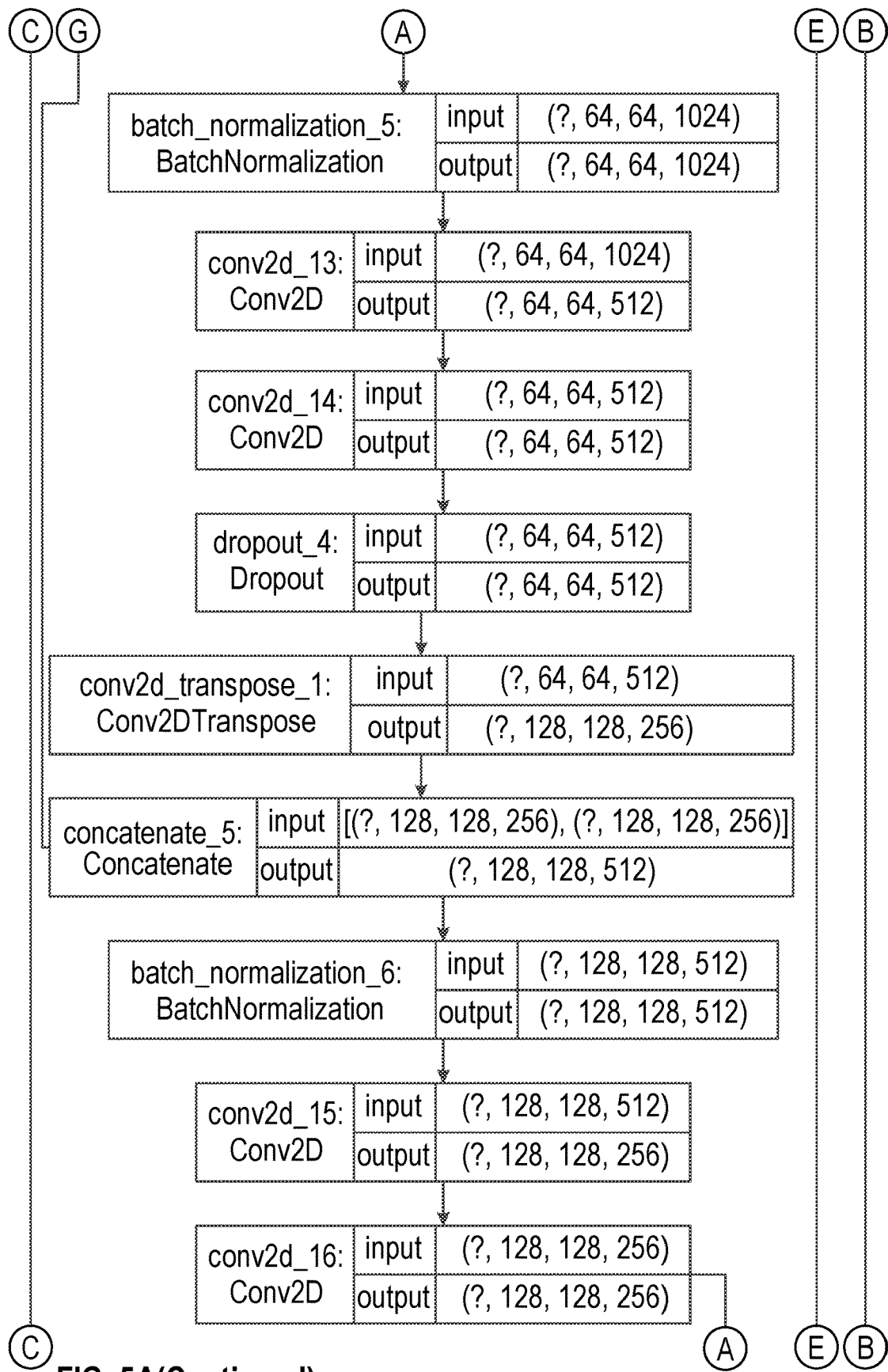
Figure 5A:
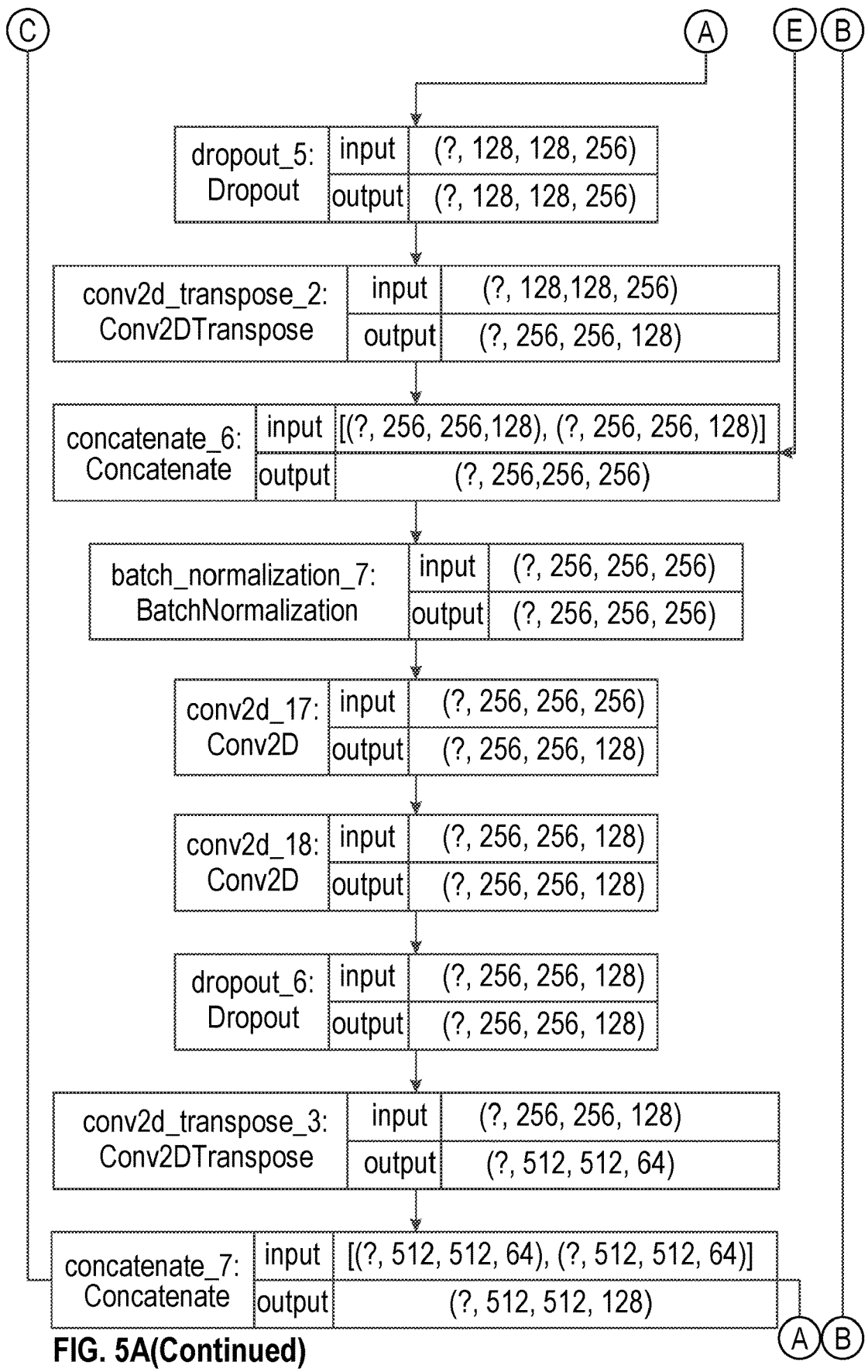
Figure 5A:
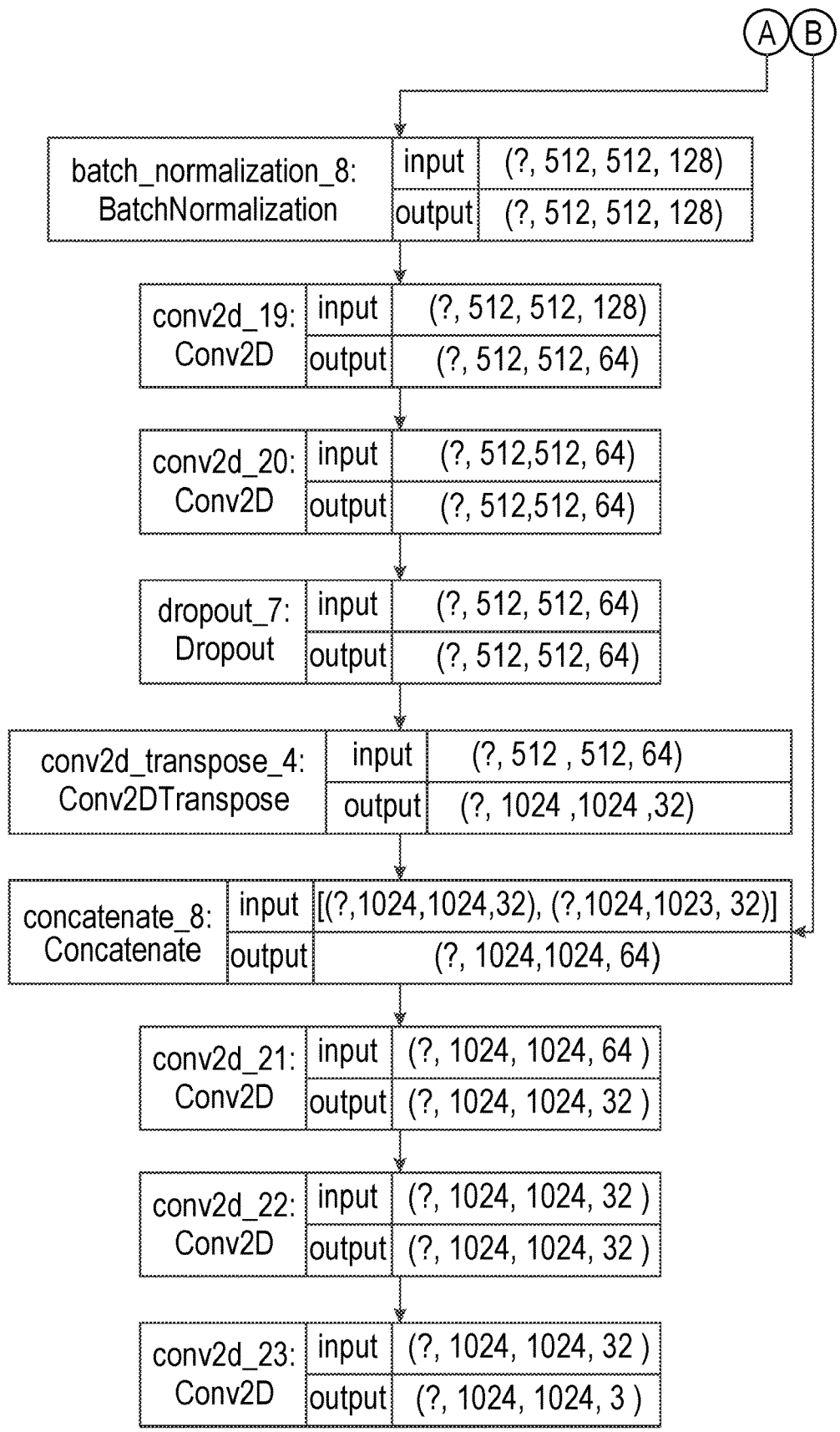

FIG. 5A depicts an architecture of one of the multiple FCNs 500 that the segmentation module 206 may use to perform tree segmentation in some embodiments. Each of the multiple FCNs 500 may have an architecture generally similar to that depicted in FIG. 5A. In some embodiments, the FCN 500 has a single input layer (input_1:Input_Layer) that takes as input a four-band satellite image. The input data of the first input layer has a shape of (batch size, image height, image width, and the number of channels), and the output data has the same shape. In this example, the value of the batch size question mark ("?") may be a batch size value that depends upon the number of images in the batch. In some embodiments, the FCN 500 has a single input layer. In some embodiments, the FCN 500 has as many as three additional input layers (input_2:InputLayer, input_3:InputLayer, and input_4:InputLayer). In such embodiments, the input data to the three additional input layers are heat maps that are usable as additional signals to the FCN 500 for tree segmentation. As illustrated in FIG. 5A, the FCN 500 has multiple layers. A layer has the shape of (batch size, image height, image width, and the number of channels), or of several of (batch size, image height, image width, and the number of channels), and the output data has the same shape.

As with the first input layer, the value of the batch size is a question mark ("?") as the batch size depends upon the number of images in the batch. The FCN 500 provides as output a single-band satellite image, with each pixel classified as either a tree or not a tree, in the form of an intermediate segmentation map.

Figure 5B:
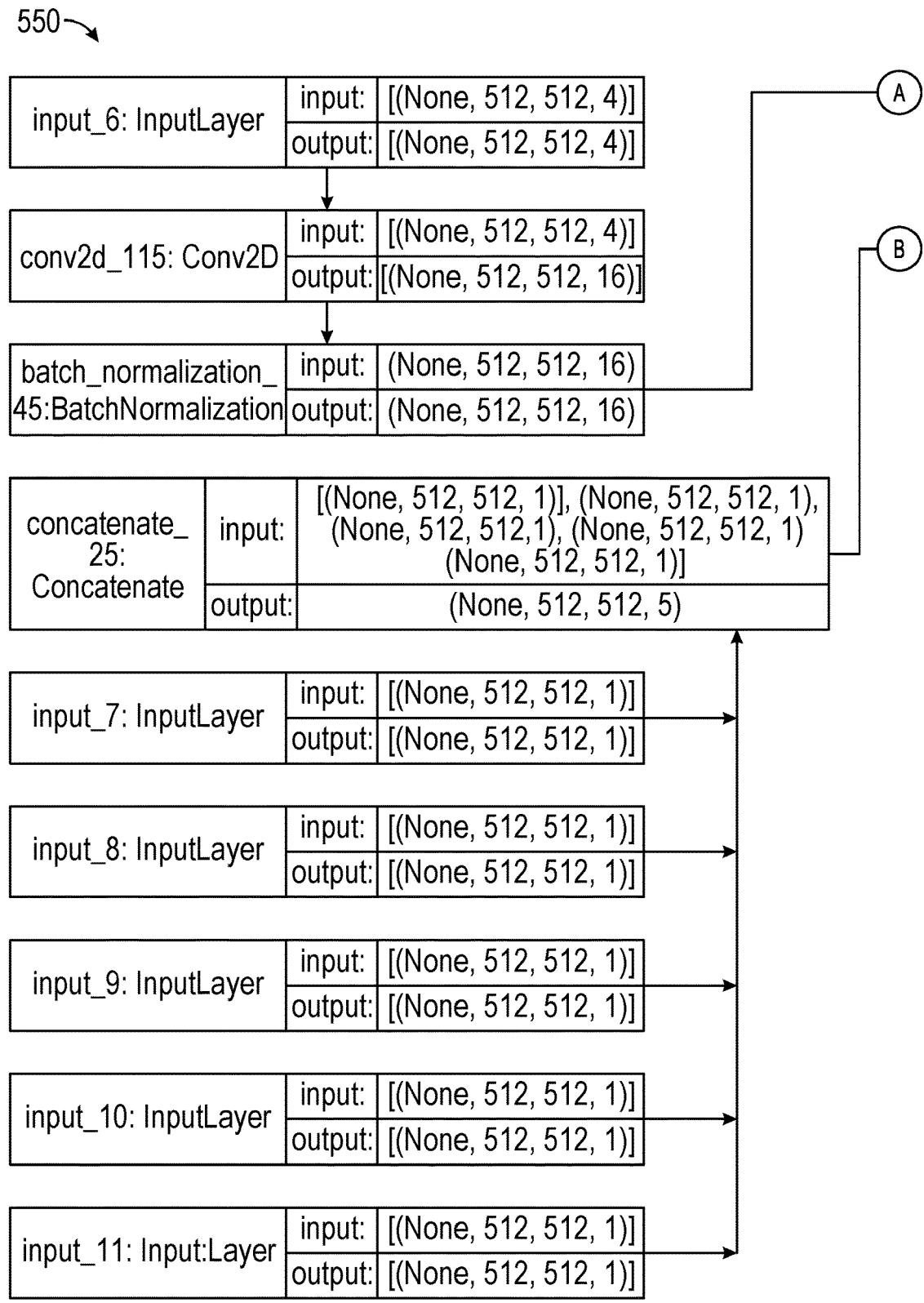
FIG. 5B depicts an architecture of an ensemble fully convolutional network that may be used to combine the output of multiple fully convolutional networks in some embodiments.
Figure 5B:
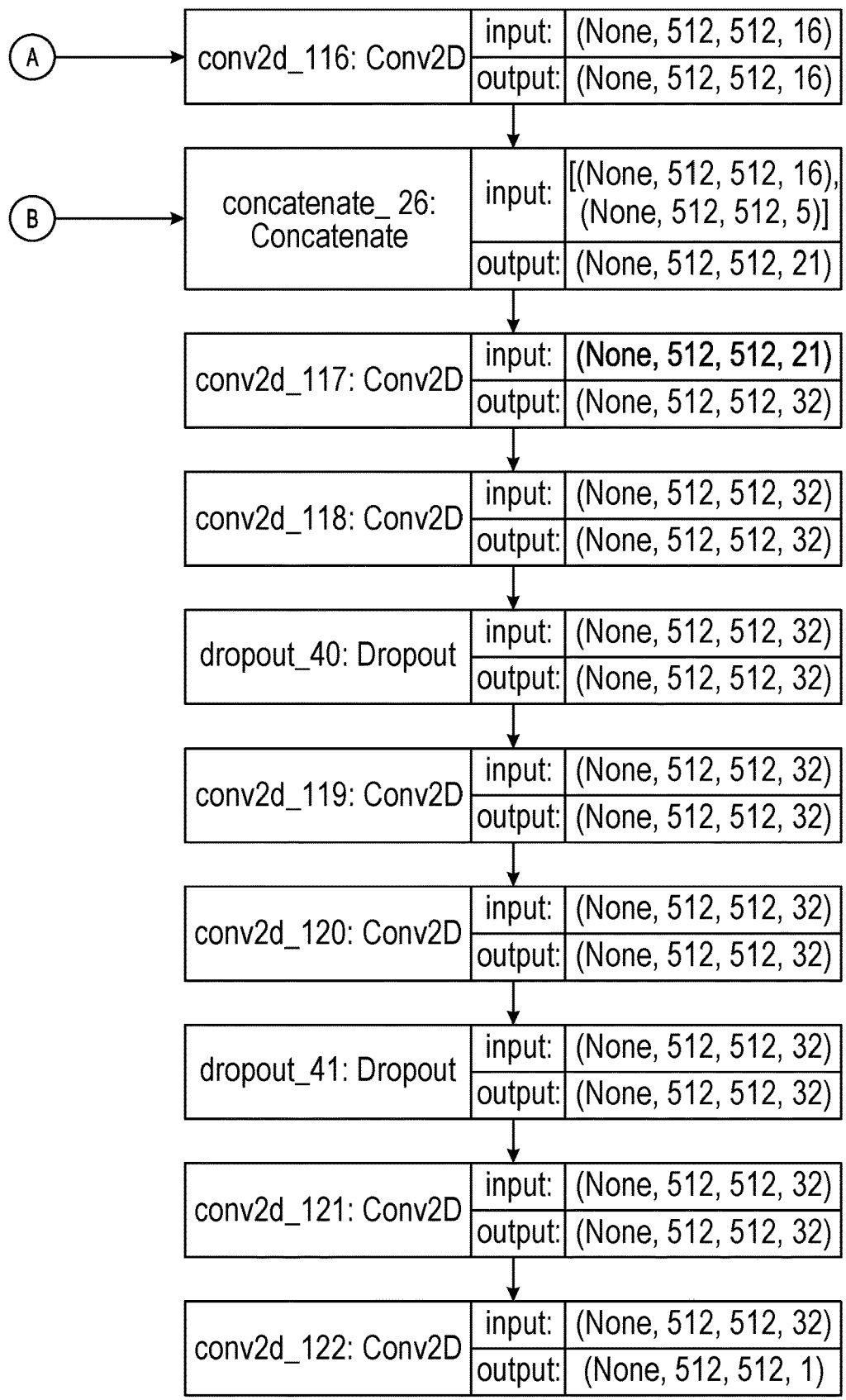

FIG. 5B depicts an architecture of an ensemble FCN 550 that the segmentation module 206 may use to combine the output of the multiple FCNs 500. Ensemble FCN 550 has six input layers. The input_6 input layer takes as input the georeferenced satellite image. The input_7, input_8, input_9, input_10, and input_11 input layers take as input the output of each of the multiple FCNs 500, that is, the multiple intermediate segmentation maps. The input data of a layer has a shape of (batch size, image height, image width, and the number of channels), or of several of (batch size, image height, image width, and the number of channels), and the output data has the same shape. The value of the batch size is none.

The segmentation module 206 provides the georeferenced satellite image as input to the input_6 input layer so as to provide information that the ensemble FCN 550 may use to weight input layers input_7 through input_11. For example, for a first set of georeferenced satellite images from a first satellite image third-party, the input_7 and input_9 input data, which corresponds to the output of a first FCN 500 and a third FCN 500, might be quite accurate, while the input_8, input_10, and input_11 input data might not need a desired degree of accuracy. Accordingly, the ensemble FCN 550 may weight input layers input_7 and input_9 more and the ensemble FCN 550 may weight input layers input_8, input_10, and input_11 less. The architecture of ensemble FCN 550 allows for the combination of the outputs of each FCN 500 so as to result in a required degree of accuracy for tree segmentation. Accordingly, the segmentation module 206 generates a segmentation map in which pixels are classified as either trees or non-trees to a required degree of accuracy.

FIG. 6A displays a table 600 containing results of tree segmentation for different sets of georeferenced satellite images (Data Sets 1 through 5) done by five FCNs 500 (Data Sets 1 through 5 Models) and the ensemble FCN 550 using outputs of the five FCNs 500 (Ensemble Model). As can be seen by examining the results in table 600, for each of the five Data Sets, the ensemble FCN 550 provides results that are at least generally greater than or equal to the results of an individual FCN 500. The results of ensemble FCN 550 are also better than that of a prior neural network (Previous Model).

FIG. 6B depicts a table 610, a table 620, a table 630, and a table 640, each of which contains results validating the ensemble FCN 550 (Ensemble Model). Table 610 shows that the average score across Data Sets 1 through 5 for the ensemble FCN 550 is better than the average score across Data Sets 1 through 5 of a prior neural network (Previous Model).

Figure 11:
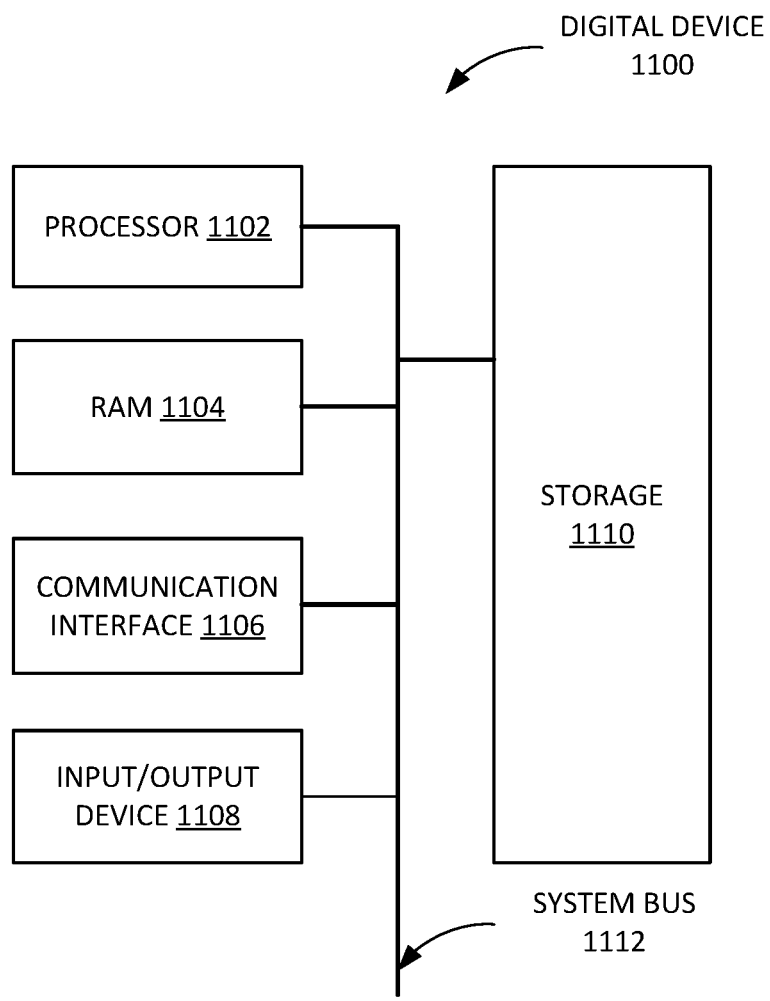
FIG. 11 depicts a block diagram of an example digital device in some embodiments.

FIG. 11 depicts a block diagram of an example digital device 1100 according to some embodiments. Digital device 1100 is shown in the form of a general-purpose computing device. Digital device 1100 includes at least one processor 1102, RAM 1104, communication interface 1106, input/output device 1108, storage 1110, and a system bus 1112 that couples various system components including storage 1110 to the at least one processor 1102.

System bus 1112 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Digital device 1100 typically includes a variety of computer system readable media. Such media may be any available media that is accessible by the VIMS 104 and it includes both volatile and nonvolatile media, removable and non-removable media.

In some embodiments, the at least one processor 1102 is configured to execute executable instructions (for example, programs). In some embodiments, the at least one processor 1102 comprises circuitry or any processor capable of processing the executable instructions.

In some embodiments, RAM 1104 stores data. In various embodiments, working data is stored within RAM 1104. The data within RAM 1104 may be cleared or ultimately transferred to storage 1110.

In some embodiments, communication interface 1106 is coupled to a network via communication interface 1106. Such communication may occur input/output device 1108. Still yet, VIMS 104 can communicate with one or more networks such as a local area network (LAN), a general wide area network (WAN), and/or a public network (for example, the Internet).

In some embodiments, input/output device 1108 is any device that inputs data (for example, mouse, keyboard, stylus) or outputs data (for example, speaker, display, virtual reality headset).

In some embodiments, storage 1110 can include computer system readable media in the form of volatile memory, such as read only memory (ROM) and/or cache memory. Storage 1110 may further include other removable/non-removable, volatile/non-volatile computer system storage media. By way of example only, storage 1110 can be provided for reading from and writing to a non-removable, non-volatile magnetic media. The storage 1110 may include non-transitory computer-readable media that stores programs or applications for performing functions such as those described herein with reference to, for example, FIG. 2. Although not shown, a magnetic disk drive for reading from and writing to a removable, non-volatile magnetic disk (for example, a "floppy disk"), and an optical disk drive for reading from or writing to a removable, non-volatile optical disk such as a CDROM, DVD-ROM or other optical media can be provided. In such instances, each can be connected to system bus 1112 by one or more data media interfaces. As will be further depicted and described below, storage 1110 may include at least one program product having a set (for example, at least one) of program modules that are configured to carry out the functions of embodiments of the invention. In some embodiments, RAM 1104 is found within storage 1110.

Program/utility, having a set (at least one) of program modules, such as VIMS 104, may be stored in storage 1110 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with VIMS 104. Examples include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific examples are described above for illustrative purposes, various equivalent modifications are possible, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The invention claimed is:

1. A non-transitory computer-readable medium comprising executable instructions, the executable instructions being executable by one or more processors to perform a method, the method comprising:
   receiving a set of georeferenced satellite images of a geographic region, the geographic region including multiple geographic areas, the multiple geographic areas including multiple electrical assets of one or more power distribution infrastructures;
   generating one or more segmentation maps by providing the set of georeferenced satellite images to one or more fully convolutional networks to classify pixels of the set of georeferenced satellite images as either trees or non-trees;
   generating one or more rasters of the geographic region based on the one or more segmentation maps and the set of georeferenced satellite images;
   generating one or more vectors based on the one or more rasters, a vector including one or more polygons, a polygon representing a tree and having a set of coordinates defining the polygon;
   receiving one or more digital surface models of the geographic region;
   generating one or more canopy height models of the geographic region based on the one or more digital surface models by:
      downsampling the one or more digital surface models until a peak signal to noise ratio (PSNR) of multiple downsamples of the one or more digital surface models converge to create one or more initial digital terrain models (DTM);
      generating one or more initial canopy height models by subtracting the one or more initial digital terrain models from the one or more digital surface models;
      determining first pixels in the one or more initial canopy height models that have heights greater than a second threshold to indicate heights of objects above ground height;
      interpolating ground height of pixels next to the first pixels to represent ground heights to generate one or more final DTMs; and
      generating the one or more canopy height models of the geographic region by subtracting the one or more final digital terrain models from the one or more digital surface models;
   associating the heights of the one or more trees with the one or more polygons of the one or more vectors based on the one or more canopy height models;
   calculating a first distance between a first polygon having a first height and a first electrical asset of the one or more power distribution infrastructures;
   comparing the first distance and the first height;
   identifying a first tree represented by the first polygon as a potential hazard based on the comparing of the first distance and the first height; and
   providing a notification of the identification of the first tree as a potential hazard.

2. The non-transitory computer-readable medium of claim 1, the method further comprising:
   calculating second distances between second polygons having second heights and second electrical assets of the one or more power distribution infrastructures;
   comparing the second distances and the second heights;
   identifying second trees represented by the second polygons as potential hazards based on the comparing of the second distances and the second heights;
   determining one or more facilities within each of the multiple geographic areas that are connected to second electrical assets of the one or more power distribution infrastructures;
   ranking the multiple geographic areas based on the second trees identified as potential hazards and the one or more facilities; and providing a notification of the ranking of the multiple geographic areas.

3. The non-transitory computer-readable medium of claim 2, the method further comprising:
modifying at least one vegetation trim plan for the multiple geographic areas based upon the ranking of the multiple geographic areas.

4. The non-transitory computer-readable medium of claim 3, wherein modifying at least one vegetation trim plan for the multiple geographic areas includes modifying a frequency of occurrence of the at least one vegetation trim plan.

5. The non-transitory computer-readable medium of claim 1, the method further comprising:
receiving a set of georeferenced stereo satellite images of the geographic region; and
generating the one or more digital surface models of the geographic region based on the set of georeferenced stereo satellite images of the geographic region.

6. The non-transitory computer-readable medium of claim 1, wherein downsampling the one or more digital surface models until a peak signal to noise ratio (PSNR) of multiple downsamples of the one or more digital surface models converge to create one or more initial digital terrain models (DTM) comprises performing minimum pooling operations on the one or more digital surface models until a calculated peak signal to noise ratio of one or more initial digital terrain models to the one or more digital surface models does not exceed a first threshold,
wherein interpolating the ground height of pixels next to the first pixels to represent ground heights to generate one or more final DTMs comprises: determining second pixels in the one or more initial digital terrain models corresponding to the first pixels and replacing heights of the second pixels with null values, determining third pixels surrounding the second pixels in the one or more initial digital terrain models, and generating one or more final digital terrain models by interpolating heights from the third pixels and replacing the heights of the second pixels with the interpolated heights.

7. The non-transitory computer-readable medium of claim 1, the method further comprising:
determining a first triangle defined by the first height, a distance from a pixel of the first polygon corresponding to a center of mass of the polygon to the electrical asset, and a calculated hypotenuse; and
utilizing the first triangle in the identification of the first tree represented by the first polygon as a potential hazard.

8. The non-transitory computer-readable medium of claim 1, wherein the first polygon has one or more heights, and the first height is a maximum height of the one or more heights.

9. The non-transitory computer-readable medium of claim 1, the method further comprising:
calculating an area of the first polygon; and
calculating a volume of the first tree using the first height and the calculated area of the first polygon.

10. The non-transitory computer-readable medium of claim 9, the method further comprising:
identifying a species of the first tree; and
utilizing the species of the tree in calculating the volume of the first tree.

11. The non-transitory computer-readable medium of claim 1, wherein generating the one or more segmentation maps includes:
providing the set of georeferenced satellite images to multiple fully convolutional networks to classify pixels of the set of georeferenced satellite images as either trees or non-trees to obtain multiple intermediate segmentation maps, wherein each of the multiple fully convolutional networks is trained on georeferenced satellite images from a particular satellite image third-party; and
providing the multiple intermediate segmentation maps to a fully convolutional network to combine the multiple intermediate segmentation maps to obtain the one or more segmentation maps.

12. A system comprising at least one processor; and memory containing instructions, the instructions being executable by the at least one processor to:
receive a set of georeferenced satellite images of a geographic region, the geographic region including multiple geographic areas, the multiple geographic areas including multiple electrical assets of one or more power distribution infrastructures;
generate one or more segmentation maps by providing the set of georeferenced satellite images to one or more fully convolutional networks to classify pixels of the set of georeferenced satellite images as either trees or non-trees;
generate one or more rasters of the geographic region based on the one or more segmentation maps and the set of georeferenced satellite images;
generate one or more vectors based on the one or more rasters, a vector including one or more polygons, a polygon representing a tree and having a set of coordinates defining the polygon;
receive one or more digital surface models of the geographic region;
generate one or more canopy height models of the geographic region based on the one or more digital surface models, the one or more canopy height models including heights of one or more trees in the geographic region by the instructions executable by the at least one processor to:
downsample the one or more digital surface models until a peak signal to noise ratio (PSNR) of multiple downsamples of the one or more digital surface models converge to create one or more initial digital terrain models (DTM);
generate one or more initial canopy height models by subtracting the one or more initial digital terrain models from the one or more digital surface models,
determine first pixels in the one or more initial canopy height models that have heights greater than a second threshold to indicate heights of objects above ground height;
interpolate ground height of pixels next to the first pixels to represent ground heights to generate one or more final DTMs; and
generate the one or more canopy height models of the geographic region by subtracting the one or more final digital terrain models from the one or more digital surface models;
associate the heights of the one or more trees with the one or more polygons of the one or more vectors based on the one or more canopy height models;
calculate a first distance between a first polygon having a first height and a first electrical asset of the one or more power distribution infrastructures;
compare the first distance and the first height;
identify a first tree represented by the first polygon as a potential hazard based on the comparing of the first distance and the first height; and provide a notification of the identification of the first tree as a potential hazard.

13. The system of claim 12, the instructions being further executable by the at least one processor to:
calculate second distances between second polygons having second heights and second electrical assets of the one or more power distribution infrastructures;
compare the second distances and the second heights;
identify second trees represented by the second polygons as potential hazards based on the comparing of the second distances and the second heights;
determine one or more facilities within each of the multiple geographic areas that are connected to second electrical assets of the one or more power distribution infrastructures;
rank the multiple geographic areas based on the second trees identified as potential hazards and the one or more facilities; and
provide a notification of the ranking of the multiple geographic areas.

14. The system of claim 13, the instructions being further executable by the at least one processor to modify at least one vegetation trim plan for the multiple geographic areas based upon the ranking of the multiple geographic areas.

15. The system of claim 14, wherein modifying at least one vegetation trim plan for the multiple geographic areas includes modifying a frequency of occurrence of the at least one vegetation trim plan.

16. The system of claim 12, the instructions being further executable by the at least one processor to:
receive a set of georeferenced stereo satellite images of the geographic region; and
generate the one or more digital surface models of the geographic region, based on the set of georeferenced stereo satellite images of the geographic region.

17. The system of claim 12, wherein the instructions executable by the at least one processor to
downsample the one or more digital surface models until a peak signal to noise ratio (PSNR) of multiple downsamples of the one or more digital surface models converge to create one or more initial digital terrain models (DTM) comprises perform minimum pooling operations on the one or more digital surface models until a calculated peak signal to noise ratio of one or more initial digital terrain models to the one or more digital surface models does not exceed a first threshold,
wherein the instructions executable by the at least one processor to interpolate the ground height of pixels next to the first pixels to represent ground heights to generate one or more final DTMs comprises:
determine second pixels in the one or more initial digital terrain models corresponding to the first pixels and replacing heights of the second pixels with null values, determine third pixels surrounding the second pixels in the one or more initial digital terrain models, and generate one or more final digital terrain models by interpolating heights from the third pixels and replacing the heights of the second pixels with the interpolated heights.

18. The system of claim 12, wherein the first polygon has one or more heights, and the first height is a maximum height of the one or more heights.

19. The system of claim 12, wherein the instructions executable by the at least one processor to generate the one or more segmentation maps include instructions executable by the at least one processor to:

provide the set of georeferenced satellite images to multiple fully convolutional networks to classify pixels of the set of georeferenced satellite images as either trees or non-trees to obtain multiple intermediate segmentation maps, wherein each of the multiple fully convolutional networks is trained on georeferenced satellite images from a particular satellite image third-party; and
provide the multiple intermediate segmentation maps to a fully convolutional network to combine the multiple intermediate segmentation maps to obtain the one or more segmentation maps.

20. A method comprising:
receiving a set of georeferenced satellite images of a geographic region, the geographic region including multiple geographic areas, the multiple geographic areas including multiple electrical assets of one or more power distribution infrastructures;
generating one or more segmentation maps by providing the set of georeferenced satellite images to one or more fully convolutional networks to classify pixels of the set of georeferenced satellite images as either trees or non-trees;
generating one or more rasters of the geographic region based on the one or more segmentation maps and the set of georeferenced satellite images;
generating one or more vectors based on the one or more rasters, a vector including one or more polygons, a polygon representing a tree and having a set of coordinates defining the polygon;
receiving one or more digital surface models of the geographic region;
generating one or more canopy height models of the geographic region based on the one or more digital surface models, the one or more canopy height models including heights of one or more trees in the geographic region by:
downsampling the one or more digital surface models until a peak signal to noise ratio (PSNR) of multiple downsamples of the one or more digital surface models converge to create one or more initial digital terrain models (DTM);
generating one or more initial canopy height models by subtracting the one or more initial digital terrain models from the one or more digital surface models,
determining first pixels in the one or more initial canopy height models that have heights greater than a second threshold to indicate heights of objects above ground height;
interpolating ground height of pixels next to the first pixels to represent ground heights to generate one or more final DTMs; and
generating the one or more canopy height models of the geographic region by subtracting the one or more final digital terrain models from the one or more digital surface models;
associating the heights of the one or more trees with the one or more polygons of the one or more vectors based on the one or more canopy height models;
calculating a first distance between a first polygon having a first height and a first electrical asset of the one or more power distribution infrastructures;
comparing the first distance and the first height;
identifying a first tree represented by the first polygon as a potential hazard based on the comparing of the first distance and the first height; and providing a notification of the identification of the first tree as a potential hazard.

* * * * *